US006560236B1

(12) United States Patent
Varghese et al.

(10) Patent No.: US 6,560,236 B1
(45) Date of Patent: May 6, 2003

(54) VIRTUAL LANS

(75) Inventors: George Varghese, Bradford, MA (US); John Bassett, Reading (GB); Robert Eugene Thomas, Hudson, MA (US); Peter Higginson, Herts (GB); Graham Cobb, Farnham (GB); Barry A. Spinney, Wayland, MA (US); Robert Simcoe, Westboro, MA (US)

(73) Assignee: Enterasys Networks, Inc., Rochester, NH (US)

( * ) Notice: Subject to any disclaimer, the term of this patent is extended or adjusted under 35 U.S.C. 154(b) by 0 days.

(21) Appl. No.: 09/411,773

(22) Filed: Oct. 4, 1999

Related U.S. Application Data

(63) Continuation of application No. 08/731,905, filed on Oct. 22, 1996, now Pat. No. 5,963,556, which is a continuation of application No. 08/081,622, filed on Jun. 23, 1993, now abandoned.

(51) Int. Cl.⁷ .......................... H04L 12/28; H04L 12/56
(52) U.S. Cl. ........................................ 370/401; 370/432
(58) Field of Search .................. 370/254, 259, 370/260, 261, 262, 263, 264, 265, 270, 351, 389, 390, 431, 432, 908, 911, 912, 312, 401; 379/156, 157, 158, 202.01, 221.15, 901

(56) References Cited

U.S. PATENT DOCUMENTS

| | | | | |
|---|---|---|---|---|
| 4,460,807 A | * | 7/1984 | Kerr et al. | 179/18 BC |
| 4,713,806 A | | 12/1987 | Oberlander et al. | |
| 4,893,307 A | | 1/1990 | McKay et al. | |
| 4,937,856 A | * | 6/1990 | Natarajan | 379/158 |
| 5,311,593 A | | 5/1994 | Carmi | |
| 5,313,465 A | | 5/1994 | Perlman et al. | |
| 5,341,372 A | | 8/1994 | Kirkham | |
| 5,343,471 A | | 8/1994 | Cardagnol | |
| 5,361,256 A | | 11/1994 | Doeringer et al. | |
| 5,371,852 A | | 12/1994 | Attanasio et al. | |
| 5,379,296 A | | 1/1995 | Johnson et al. | |
| 5,430,726 A | | 7/1995 | Moorwood et al. | |
| 5,483,587 A | * | 1/1996 | Hogan et al. | 379/202 |
| 5,638,434 A | * | 6/1997 | Gottlieb et al. | 379/203 |
| 5,850,606 A | * | 12/1998 | Bedingfield, Sr. et al. | 455/439 |
| 5,991,385 A | * | 11/1999 | Dunn et al. | 379/202 |
| 6,163,692 A | * | 12/2000 | Chakrabarti et al. | 455/416 |
| 6,219,412 B1 | * | 4/2001 | Wellner et al. | 379/202 |
| 6,236,644 B1 | * | 5/2001 | Shuman et al. | 370/261 |

* cited by examiner

Primary Examiner—Ajit Patel
(74) Attorney, Agent, or Firm—Wolf, Greenfield & Sacks, P.C.

(57) ABSTRACT

A network device for interconnecting computer networks, the device including a bridge having a plurality of ports through which network communications pass to and from the bridge, the bridge also including a first interface enabling a user to partition the plurality of bridge ports into a plurality of groups, wherein each group represents a different virtual network, wherein the bridge treats all ports within a given group as part of the virtual network corresponding to that group and the bridge isolates the virtual networks from each other, whereby any communications received at a first port of the bridge are directly sent by the bridge to another bridge port only if the other bridge port and the first bridge port are part of the same group.

18 Claims, 6 Drawing Sheets

VIRTUAL LANS

This application is a continuation application of prior application Ser. No. of prior application Ser. No. 08/731,905 filed Oct. 22, 1996 which issued as U.S. Pat. No. 5,963,556 on Oct. 5, 1999; which claimed priority and is a continuation to application Ser. No. 08/081,622, filed Jun. 23, 1993, now abandoned.

BACKGROUND OF THE INVENTION

The invention relates to Local Area Networks (LANs) and to bridges and routers that are used on such networks.

Bridges are devices that connect local area networks (LANs) together to form what are referred to as Extended LANs. Large Extended LANs have proven to be difficult to manage because of fault-isolation and addressing problems. The present invention enables a LAN manager to divide a large Extended LAN into smaller virtual LANs that have less overhead and are easier to manage. It further allows the LAN manager to interconnect the virtual LANs with a router.

The recent emergence of large multiport bridges, such as GIGAswitch from Digital Equipment Corporation, which can bridge up to 22 FDDI LANs, enable users to create a large extended LAN. That is, logically it appears that all stations that are bridged together by the switch are on a single LAN. This large configuration is reasonable if the bridge is at the periphery of the extended network and is responsible for bridging together a small number (say 100–250) of stations. However, there are two disadvantages if the bridge is used as the backbone of a large extended LAN. First, implementation and addressing limitations may limit the number of stations that can be present on a single Extended LAN. For example, it is well-known that broadcast traffic used in a LAN does not scale well as the number of LAN stations increases. The second problem is the lack of "firewalls" between the individual LANs that are bridged together by the bridge. An error on one LAN caused by a particular protocol failure can cause all other protocols on the LAN to fail. For example, if a set of stations on a particular LAN get stuck in a loop where they keep generating broadcast traffic, then the entire Extended LAN can fail. Thus some users choose to use a device called a router (as opposed to a bridge) to interconnect LANs.

There are several well-known differences between bridges and routers which make interconnecting LANs with routers more flexible and easier to manage. Routers allow users to construct extremely large and yet manageable networks. Some reasons for this are as follows. First, routers typically do not allow broadcast traffic; if they do, the broadcast traffic can be carefully controlled. By contrast, bridges must allow broadcast to allow LAN protocols to work correctly. Second, routers can be used to break up networks into a hierarchy of manageable subnetworks; bridges cannot. Third, routers have access to more information fields in messages than do bridges; this allows routers to have more discrimination in enforcing security and performance policies.

SUMMARY OF THE INVENTION

This invention provides a way of dividing a large Extended LAN up into multiple "Virtual" LANs (Vlans), which are interconnected by routers. The division is flexible and can be controlled by the manager. The division of the bridge ports into virtual LANs can also be done differently for different protocols.

In general, in one aspect, the invention features a a network device for interconnecting computer networks. The network device includes a bridge having a plurality of ports through which network communications pass to and from said bridge, and it also includes a first interface enabling a user to partition the plurality of bridge ports into a plurality of groups, wherein each group represents a different virtual network. The bridge treats all ports within a given group as part of the virtual network corresponding to that group and the bridge isolates the virtual networks from each other, whereby any communications received at a first bridge port are directly sent by the bridge to another bridge port only if the other bridge port and the first bridge port are part of the same group.

Preferred embodiments include the following features. The bridge also includes a second interface for enabling the user to designate one or more of the plurality of bridge ports as client ports, wherein the bridge sends to the client ports communications that are received from a station on one of said virtual networks and ultimately destined for a station on another of said virtual networks. The network device also includes a router connected to the bridge through the one or more client ports. The router includes a plurality of ports through which network communications pass to and from the router. The router includes an interface enabling the user to designate which one or more of the router ports are connected to the bridge. The router also includes a source table that contains a mapping of source addresses to the virtual networks, the source addresses representing locations of stations that are connected to the virtual networks and that send communications to the bridge. Upon receiving a unicast packet from the bridge, the router uses the source table to identify the virtual network from which the unicast packet came.

Alternatively, in preferred embodiments, the router is assigned a different router address for each of the virtual networks. The router includes a table assigning a different router address to the router for each of the virtual networks. When a unicast packet is sent from a first station on a first virtual network and destined for a second station on a second virtual network, it contains the router address corresponding to the first virtual network. The router identifies the virtual network from which the unicast packet originated by detecting the router address in the unicast packet and through the table determining that the router address corresponds to the first virtual network.

Also in preferred embodiments, the router includes a database identifying each of the virtual networks by a different network identifier. When the router sends to the bridge a multicast packet that is intended for one of the virtual networks, the router adds a network identifier to the multicast packet, the added network identifier being obtained from the database and identifying the virtual network for which the multicast packet is intended. The bridge, upon receipt of the multicast packet sent, removes the network identifier from the multicast packet and then forwards the modified multicast packet to the virtual network identified by the network identifier. The bridge also includes a database mapping the bridge ports to the virtual networks and the bridge uses that database to identify the bridge ports to which the bridge forwards the modified multicast packet. Upon receipt of a multicast packet from any of the virtual networks, the bridge adds source information to the received multicast packet and forwards the resulting multicast packet through one of the client ports to the router. The bridge uses the database to obtain the source information that is added to the multicast packet and it identifies the virtual network from which the multicast packet received.

Preferred embodiments also include the following additional features. The bridge includes a forwarding table which maps addresses of stations to bridge ports. Upon receipt at the bridge of a unicast packet sent by the router and having a destination address located on one of the virtual networks, the bridge determines from the forwarding table through which bridge port that destination address is reachable and then forwards the unicast packet through the identified bridge port. The router includes a memory storing a server record that identifies the bridge to the router, that identifies the one or more designated router ports, and that identifies which of the one or more designated router ports is operational. The router memory also stores a virtual network record for each of the virtual networks. Each of the virtual network records identifies the virtual network with which it is associated and it also identifies a particular one of the one or more designated router ports as the port through which the router sends communications to the virtual network associated with that virtual network record. The bridge also includes a memory storing a virtual network record for each of the virtual networks. Each of the virtual network records in bridge memory identifies the virtual network with which it is associated and it identifies a particular one of the one or more client ports as the client port through which the bridge sends communications to the virtual network associated with that virtual network record.

The invention enables the manager to reconfigure Vlans easily as the needs of the network changes. Reconfiguration of the network is done by setting parameters and not by redeploying cables or boxes. It is also possible to set up Vlans differently for different protocols, thus creating multiple logical networks from the same physical network.

The invention does not rely on any special features of particular implementations though some hardware support can improve efficiency. Thus, the invention can be used with any router and bridge; and it can also be retrofitted into existing routers and bridges, thus preserving user investment.

The bridge forwarding code for unicast packets is not affected by adding Vlan support; whereas the multicast code is increased only slightly to add and remove VlanIds. The router forwarding code for sending packets is only marginally impacted (to add VlanIds for multicast packets). The router forwarding code for receiving packets is only marginally impacted under one approach. Under an alternative approach, a source lookup must be added to the code path, but this can be done efficiently with simple hardware support of the kind used in bridges.

The appendices at the end of the specification include the following:

Appendix I contains a formal description of the data structures that are stored at a client;

Appendix II contains a formal description of the data structures that are stored at a server;

Appendix III lists the basic data types that are used;

Appendix IV presents a logical view of the protocol messaging formats;

Appendix V describes the timers and macros that are used for the transport protocol at the server;

Appendix VI describes the macros that are used to assign Vlans and addresses at the server;

Appendix VII describes the server protocol actions to send and receive hellos;

Appendix VIII describes the client macros for setting up Vlans and transport connections;

Appendix IX describes the client protocol code used to set up Vlans and transport connections;

Appendix X describes the server protocol actions to send updates and receive acks;

Appendix XI describes the code to receive updates and send acks at the client;

Appendix XII describes the server macros for forwarding packets to and from Vlans;

Appendix XIII describes server code for forwarding multicast and unknown destination packets to and from Vlans;

Appendix XIV describes the macros used by the client for forwarding packets to and from Vlans; and Appendix XV describes the client protocol actions for forwarding packets to and from Vlans.

DESCRIPTION OF THE PREFERRED EMBODIMENTS

Figure 1:
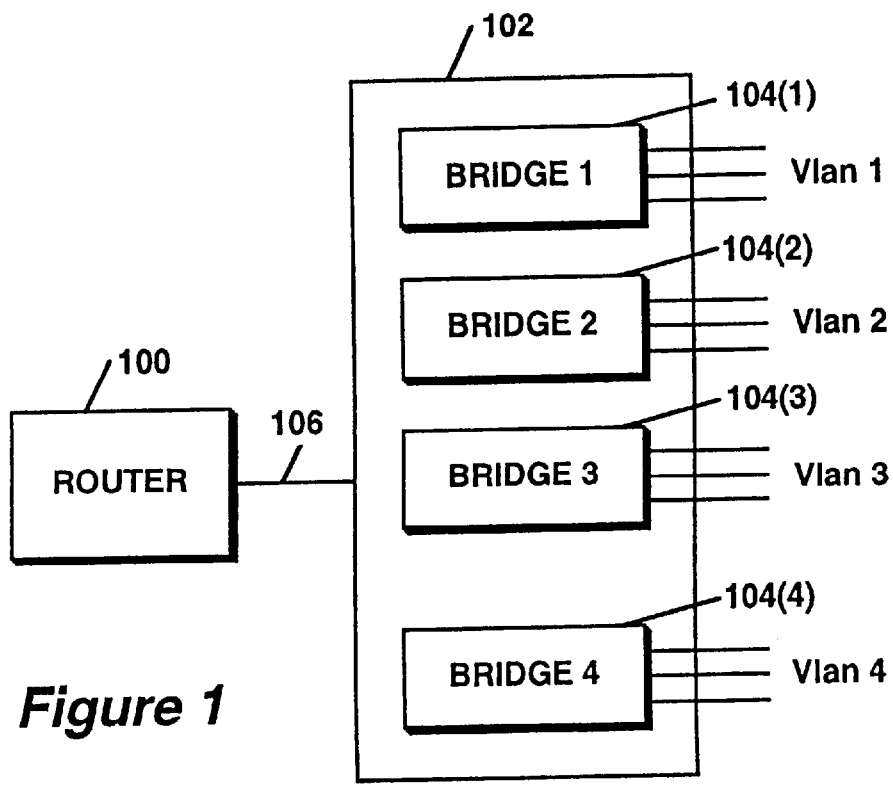
FIG. 1 is a block diagram of a router and a bridge which implement virtual LANs.

In FIG. 1 a router 100 and a bridge 102 are used to create four virtual LANS (identified as Vlan1 through Vlan4) from 12 individual LANS, each represented by a single line on the right of the figure. Router 100 is referred to herein as a VML client and bridge 102 is referred to as a VML server. Bridge 102 is a large switch, such as DEC's GIGAswitch, which has been modified to appear as four virtual bridges 104(1) through 104(4). Virtual bridges 104(1)–104(4) communicate with each other through router 100. In the described embodiment, the packets sent to router 100 by virtual bridges 104(1)–104(4) are multiplexed over a single line 106 that connects router 100 to bridge 102.

Filters internal to bridge 102 are used to make the bridge appear as a plurality of virtual bridges. And the multiplexing of packet traffic over the single line connecting bridge 102 to router 100 is accomplished by an extra protocol between a VML client layer at router 100 and a VML server layer at bridge 102. The following describes both the required bridge filters and the protocol between VML clients and servers in greater detail.

I. Setting up Vlans

Figure 2:
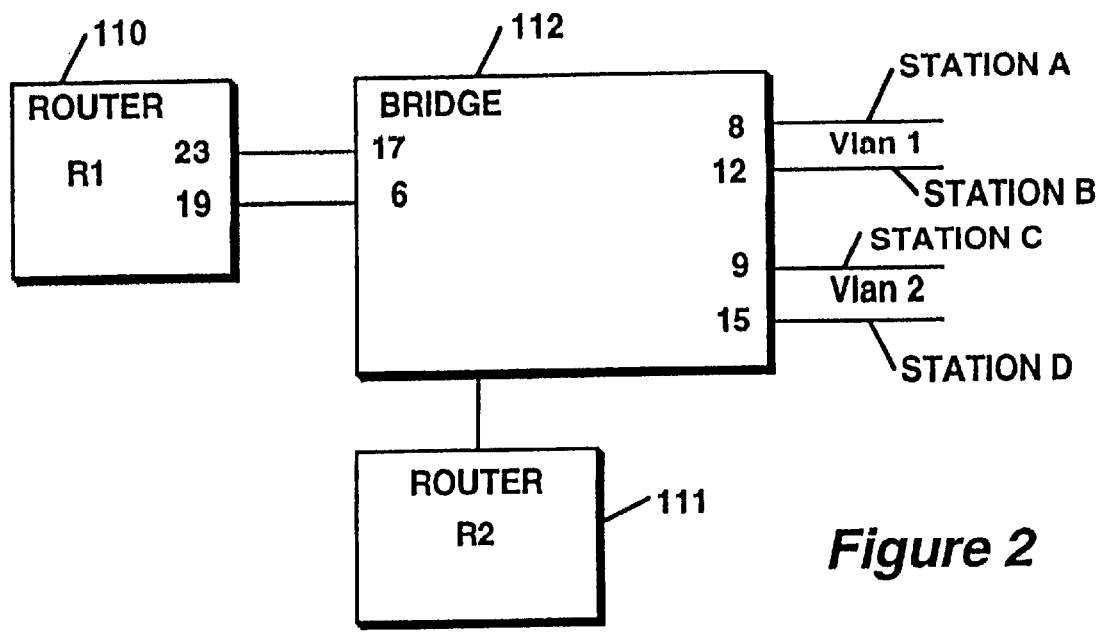
FIG. 2 is a block diagram of the invention showing port identification numbers on the router and the bridge.
Figure 3:
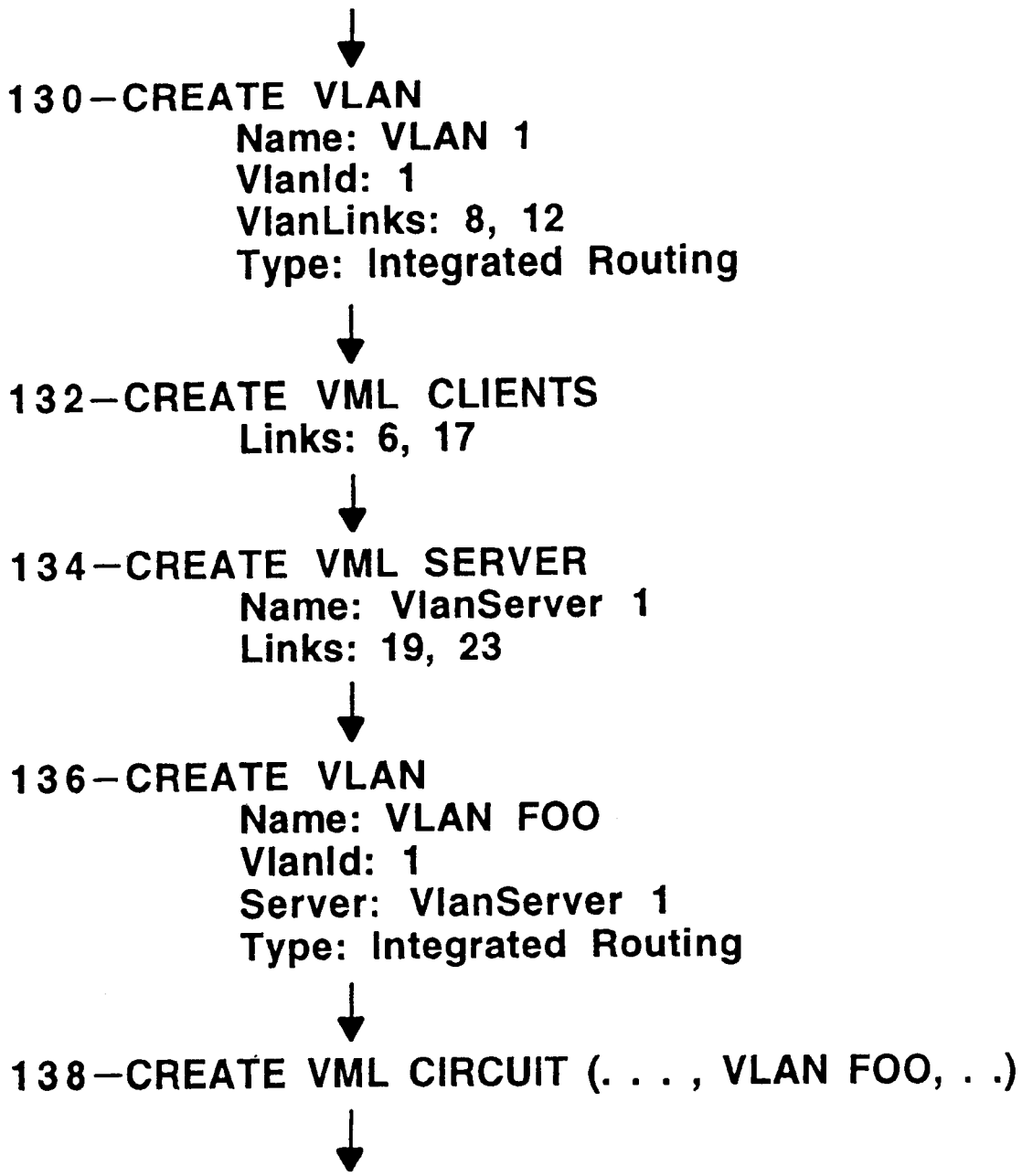
FIG. 3 shows the interfaces for setting up a virtual LAN in the configuration illustrated by FIG. 2.

The configuration in FIG. 2 of a router 110 and a bridge 112 connected by two links 114(1) and 114(2) will be used to illustrate the interfaces that are used to set up a virtual LAN. In that configuration two Vlans are shown, namely Vlan 1 and Vlan 2. The interfaces used to set up these Vlans are shown in FIG. 3.

A Vlan is set up using five steps. First, the user uses a management interface at bridge 112 to create Vlan 1 by declaring which bridge ports belong to this Vlan (i.e., ports 8 and 12 in the FIGURE) and giving the Vlan a name, which has purely local significance (step 130). During this first step, the manager also gives the Vlan a VlanId (which in this case is 1). The VlanId is used to coordinate Vlan set up at router 110 and bridge 112. A similar procedure is used to set up Vlan 2 at the bridge.

Also note that each Vlan is given a type which represents the protocols that this Vlan serves. In other words, bridge 112 can appear to be divided into different Vlans for different protocol types. This allows protocols that cannot be connected through a router to be set up so that such protocols "see" bridge 112 as a single LAN. However, any two Vlans with the same type cannot have a common bridge port.

In the next step, the manager specifies the bridge ports that are connected to VML clients (i.e., routers) (step 132). In the illustrated example, bridge ports 17 and 6 are connected to a client router. Note that the manager does not specify which client ports are connected to the same router. The protocol figures this out by receiving "hellos" (to be described later) from client routers.

After the clients have been defined, the next few steps occur at the router. The user creates a VML Server at router 110 by specifying which router ports are connected to the same bridge (in this case, ports 23 and 19) (step 134). If router 110 was connected to another bridge, then the manager would create another VML server for the second bridge. The server is also given a local name.

Next, the user creates Vlans at router 110 by specifying the local name of the server, the routing type, and the VlanId used to identify the Vlan at the server end (step 136). FIG. 3 shows the creation of a Vlan locally called "FOO" at the router and which corresponds to Vlan 1 at bridge 112. The correspondence is made because they both use a common VlanId of 1. The user creates a second Vlan at router 110 corresponding to Vlan 2 at bridge 112.

Finally, for each routing type that is supported, the user creates a circuit corresponding to each Vlan. Thus, for example, a circuit is created corresponding to Vlan 1 and a second circuit can be created corresponding to Vlan 2. The net result is that the router has circuits for each Vlan.

Creating Vlans at both bridge 112 and router 110 is necessary because current router interfaces require all router circuits to be declared in advance (although their status can change to reflect whether the circuit is up or down). Also, an alternative would have been to put all the details of creating a Vlan (i.e., which server, which VlanId etc.) in the circuit creation call at router 110. However, it seemed more desirable to provide a routing layer with a clean abstraction (i.e. a Vlan) that looks very much like a LAN. It also seemed desirable that the routing layer interfaces required to create a Vlan circuit be similar to the interfaces needed to create a LAN circuit. The details of mapping Vlans are present in the VML layer.

II. Multiplexing and Demultiplexing Vlans

When packets arrive at the router from the bridge, the router must be able to tell which Vlan the packet was sent on. Similarly when packets are sent by the router to the bridge on a specific Vlan, the bridge must be able to tell which Vlan the packet was sent on. These capabilities are provided through a mechanism by which information about a Vlan (specifically the VlanId described in the previous section) is embedded in a packet. First, the mechanism will be described and then the manner by which the mechanism is used to provide the capabilities will be described.

A. Encoding a VlanId Field in a Packet:

Consider a data packet P. The system provides a function that adds to P some information (e.g. the VlanId of the Vlan) that describes the Vlan on which P was sent. The system also provides a second function that removes the VlanId field from P.

There are two simple methods by which the VlanId can be added to packet P. The simplest method is to embed P in another packet Q and to add a specially created VlanId field to the header of packet Q. To remove the VlanId field, the system simply extracts P from Q. Another method is to use a redundant field in P. If there is some field in P that contains redundant information that can be derived from other fields in P, then that field can be used to encode the VlanId field. For example, there is a redundant field called the SSAP field in the Data Link Headers of most data packets on a LAN. This field is almost always equal to another field called the DSAP field. Thus, to add the VlanId, the SSAP can be set equal to the VlanId; and to remove the VlanId, the SSAP field can be set equal to the DSAP field.

The first method is more general but the second is more efficient as it does not require the addition of headers to the original packet P.

B. Distinguishing Packets Sent from Router to Bridge:

Referring to FIG. 2, consider a packet P sent from router 110 to bridge 112 on Vlan 1. Two cases must be distinguished, namely, P is either (1) a multicast packet or a unicast packet destined to another router or (2) a unicast packet other than one destined to another router. A multicast packet is defined as a message that is sent on a LAN to a group of stations. The destination address in a multicast packet is a group or multicast address. A unicast packet is a message sent on a LAN to a single station. The destination address in a unicast packet is an individual address.

If P is a multicast packet, P has a destination address that is a group address which identifies a set of stations. In this case, it is crucial that P be sent only to bridge ports corresponding to Vlan 1. Failure to do so can cause routing protocols to break because they use multicast packets to determine which stations are present on a LAN. Thus, multicast packet P sent by router 110 must carry some information so that the bridge can identify which Vlan packet P is to be sent on. Router 110 supplies this information by adding a VlanId field to multicast packets which it sends. The VlanId field identifies the Vlan, in this case Vlan 1.

In a previous section, two options were described for adding a VlanId field to a packet. Both options for adding a VlanId require changing the normal forwarding process of a bridge. However, most bridges process multicast packets in software; thus, the required changes to the forwarding process can easily be made in software.

When bridge 112 receives multicast packet P, it reads the VlanId field in P to find which Vlan P is to be sent on. It then sends P to only the bridge ports corresponding to Vlan 1. Thus in FIG. 2, P is only sent on ports 8 and 12. P is not sent on ports 9 and 15 as these correspond to Vlan 2. However, before bridge 112 sends P on ports 8 and 12, it removes the VlanId field because LAN stations may detect an error if they receive a packet with a VlanId field.

If P is a unicast packet destined for another router 111 (also desingated R2 in FIG. 2), then the VlanId field is added to P before it is sent to the router. Once again, although this is a non-standard packet format, the router is able to receive such packets with an encoded VlanId.

If P is a unicast packet, P has a destination address that is an individual address which identifies a single station.

Router 110 could add a VlanId field to P as was done for multicast packets. However, many bridges forward unicast packets in hardware. Thus, it is hard to add the changes required for VlanId processing without redesigning the hardware. Another solution is to send a unicast packet P from the router without a VlanId field. When the packet P arrives at the bridge there are two possibilities. If the Destination Address DA in packet P is known to the bridge, packet P is sent to the bridge port corresponding to DA. If the Destination Address DA in P is unknown to the bridge, the packet P is sent on all bridge ports. For example, if packet P was destined to a Station A on Vlan 1, but the address of Station A has not been "learned" by bridge 112, then P will be sent on all ports, including that of Vlan 2. Since Station A is only on one bridge port, the other copies will be ignored. Thus, until bridge 112 learns of Station A, packets sent from router 110 to Station A will cause redundant copies to be sent on all ports. This is much the same as normal bridge operation.

C. Distinguishing Packets Sent from Bridge to Router:

Referring again to FIG. 2, suppose Station A on Vlan 1 sends a packet P that is destined to router 110. Bridge 112 forwards packet P to router 110. When packet P arrives at router 110, router 110 determines which Vlan the packet was sent on. Again, the two cases can be distinguished, one involving the handling of multicast packets and the other involving the handling of unicast packets. If the packet is a multicast packet, as noted above, bridge 112 adds a VlanId field before forwarding the packet. Thus, when router 110 receives the packet, it decodes the VlanId field to yield the Vlan the packet was sent on. If the packet is a unicast packet sent by a bridge, it will not carry a VlanId. Thus, a different approach is necessary. There are at least two different solutions, which shall be referred to as method 1 and method 2.

According to method 1, the router uses distinct source addresses for each Vlan. The router is assigned a unique source address for each Vlan it connects to. Thus, for example, referring to FIG. 4, if a router 140 has two Vlans, Vlan 1 and Vlan 2, the router is assigned an address X for Vlan 1 and an address Y for Vlan 2. When router 140 sends any packet P on Vlan 1 to bridge 142, it uses X as the source address (in the Data Link header of packet P). Similarly, when router 140 sends any packet Q on Vlan 2 to bridge 142 it uses Y as the source address. A station such Station A on Vlan 1 learns the address of router 140 from the source address of packets sent by router 140 to Station A. Thus, stations on Vlan 1, like Station A and Station B, will learn the router's address as being X. Similarly, stations on Vlan 2, like Station C and Station D, will learn the router's address as being Y. All unicast packets sent from Vlan 1 to router 140 will be sent to X; similarly all unicast packets sent from Vlan 2 to router 140 will be sent to Y. Router 140 is thus able to distinguish the Vlan on which a packet is sent by looking at the destination address. In the example, packets sent to X are for Vlan 1, while packets sent to Y are for Vlan 2.

Method 1 is elegant but has two drawbacks. First, some routing protocols insist that the router uses the same source address on all LANs that the router connects to, making this method inapplicable for such protocols. Second, this method requires that there be multiple addresses for each Vlan. This may be a problem for some implementations.

Method 2 avoids these drawbacks. Referring again to FIG. 4, according to method 2 the router keeps a Source Vlan Table 144 that associates 48-bit source addresses with Vlans. Received packets are distinguished by finding the Vlan associated with the Source Address of a received packet. For example, the router's table maps the address of Station A to Vlan 1 and the address of Station C to Vlan 2. Thus, any packet with source address of Station A that is received at the router is assumed to have been sent on Vlan 1.

Source Vlan Table 144 at router 140 is updated by bridge 142 using the following mechanism. Bridge 142 eventually learns the bridge port corresponding to each source address and enters this information into its forwarding database 146. Thus, bridge 142 will learn that Station A belongs to bridge port 8 and Station C belongs to bridge port 9. Whenever there is a change to forwarding database 146, e.g. either a new entry is learned or a "timed out" entry is deleted, bridge 142 sends this information to router 140 using a reliable transport protocol. Each update sent to router 140 also carries the mapping of ports to Vlans, i.e., bridge 142 also indicates that bridge ports 8 and 12 belong to Vlan 1, while bridge ports 9 and 15 belong to Vlan 2. On receiving such an update, router 140 has enough information to update its Source Vlan Table 144.

Method 2 is general but it requires extra processing for look-up in the Source Vlan table and for updating this table. However, most routers today are brouters, i.e., they implement the bridge forwarding algorithm as well as the normal forwarding code. Since a lookup of the source address is part of the bridge forwarding algorithm, the router often has hardware support for this operation, which makes the operation quite inexpensive. In sum, Method 2 works for all routing protocols and can be efficient with a small amount of hardware support.

D. Other Functions of VML Protocol:

In the description thus far, only LANs have been connected to the bridge. However, there could also be wide area links connected to the bridge. The VML layer makes it appear that the wide-area link is directly connected to one particular router. In other words, if the router does not have an ATM or SONET interface but the bridge does, then the VML layer can provide a LAN "pipe" between the ATM line on the bridge and the router. Conceptually, this is no different from providing virtual LANs except that these lines are typically point-to-point wide area links running protocols like HDLC and SMDS (as opposed to a LAN which has multiple stations whose addresses are unknown). Thus the Source Vlan table required for this kind of "Vlan" is quite small and static, and hence can even be updated manually.

III. The Model of a Virtual LAN Multiplexing Protocol

Figure 5:
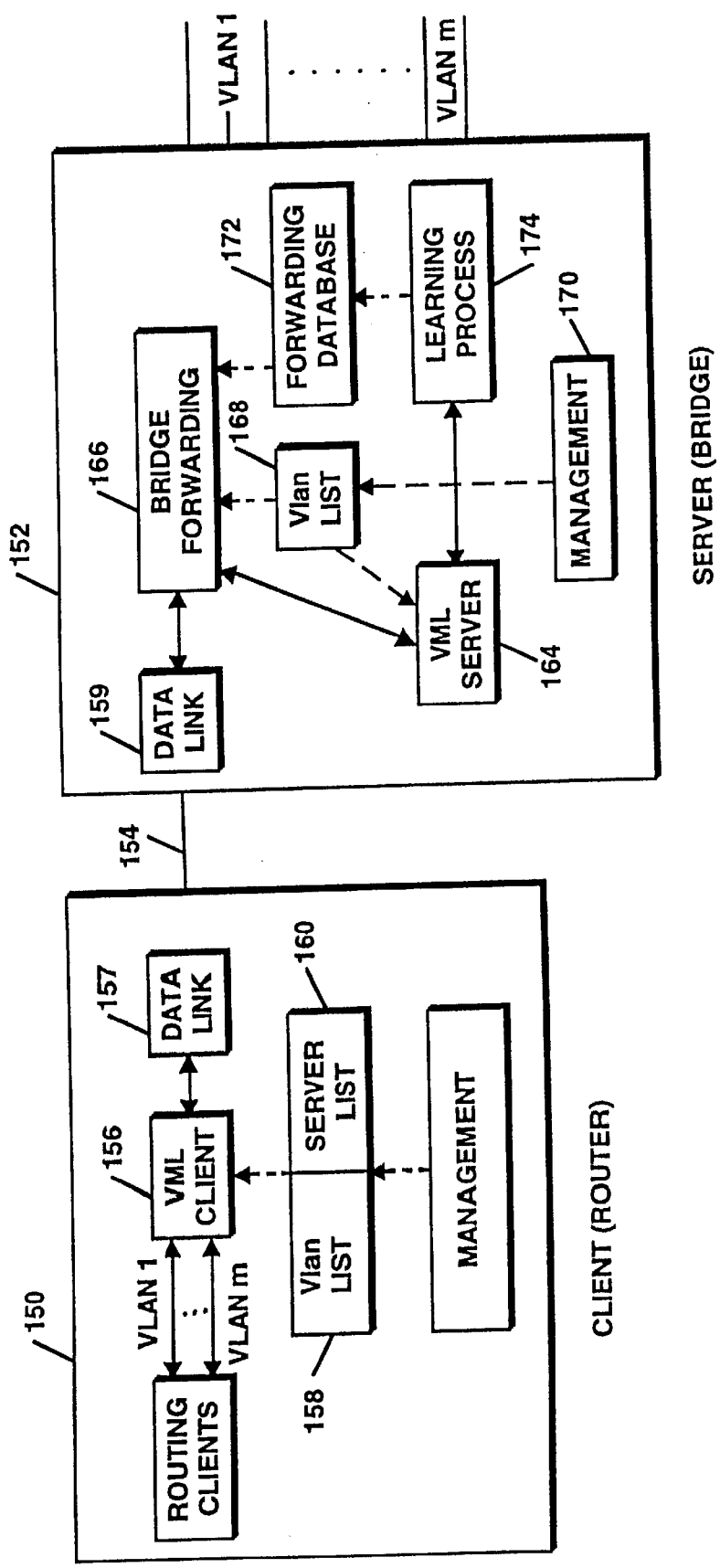
FIG. 5 is a model of a virtual LAN multiplexing protocol.

A model implementation is shown in FIG. 5. A client 150 (i.e., a router) and a server 152 (i.e., a bridge) are each connected to a link 154 through respective Data Link layers 157 and 159. In the figure, the solid lines denote the flow of packets (data flow) and the dotted lines denote the major control flow. Thus, an arrow from a process to a database indicates that the process writes the database; an arrow from the database to the process indicates that the process reads the database.

A. Clients

Each client has a single Client Vlan Multiplexing Layer (VML Client Layer) 156 which is responsible for multiplexing Vlans on to physical links to servers. The multiplexing at the client is controlled by two data structures, namely, a ServerList 158 and a VlanList 160, that are set up by management. Briefly, ServerList 158 contains an entry for every server the client is connected to, and lists the router links that are physically connected to the server. Vlanlist 160 contains an entry for every Vlan that the client wishes to connect to and lists information like the server on which this Vlan belongs and the VlanId which helps identify the Vlan at the server.

Client VML layer 156 reads ServerList 158 and VlanList 160 and uses this and other state information to multiplex and demultiplex packets. Client VML Layer 156 offers the illusion of multiple Vlans to routing protocols. The routing protocols interface to the Vlans exactly as they do to LANS, i.e., they begin by opening a port, identifying which protocol types they wish to receive, and finally sending and receiving packets on the opened port.

A routing protocol can also (optionally) open a port on what is referred to as an "unknown" Vlan. Suppose a packet is received by Client VML Layer 156 with a protocol type specified by the routing protocol. Suppose also that Client VML layer 156 is unable to decide which Vlan the packet arrived on. Then, Client VML Layer 156 queues the packet on the unknown Vlan port. The routing protocol can then optionally decide to forward or discard the packet. Forwarding packets received on unknown Vlans can help data packets to be forwarded even during periods when Client VML Layer 156 is still learning the information needed to demultiplex packets. Opening a port to the "unknown" Vlan is just a way to model this mechanism.

B. Servers

At the server end, there is a corresponding VML Server Layer 164. Unlike VML Client Layer 156 at client 150, VML Server Layer 164 is only involved in setting up Vlans at the server and not in the actual forwarding of data packets. All packets received by Data Link 159 are handed to a Bridge Forwarding Layer 166. Bridge Forwarding Layer 166 forwards unicast packets to known destinations much as they would be handled in a normal bridge; however, the handling of multicast and unicast packets to an unknown destination is quite different. Bridge Forwarding Layer 166 consults a VlanList 168 at server 152 which contains a record for every Vlan declared at the server. VlanList 168 is used to forward multicast packets received on a Vlan only to the bridge ports corresponding to that Vlan. VlanList 168 is written by management, represented in FIG. 5 by management interface 170.

VML Server Layer 164 sends Hello messages on every link that is declared to be a link to a client/router. The hellos sent on a link 154 are used to set up a transport connection to the VML Client Layer at the other end of link 154. If VML Client Layer 156 replies, a transport connection is set up. VML Server Layer 164 then begins to send updates reliably to VML Client Layer 156 on link 154.

As indicated in FIG. 5, Bridge Forwarding Layer 166 consults a Forwarding Database 172, which models the standard forwarding database on a bridge. The learning process in the bridge is modelled by a Learning Process 174 which writes information to Forwarding Database 172. There is also an interface between Learning Process 14 and VML Server 164.

Figure 4:
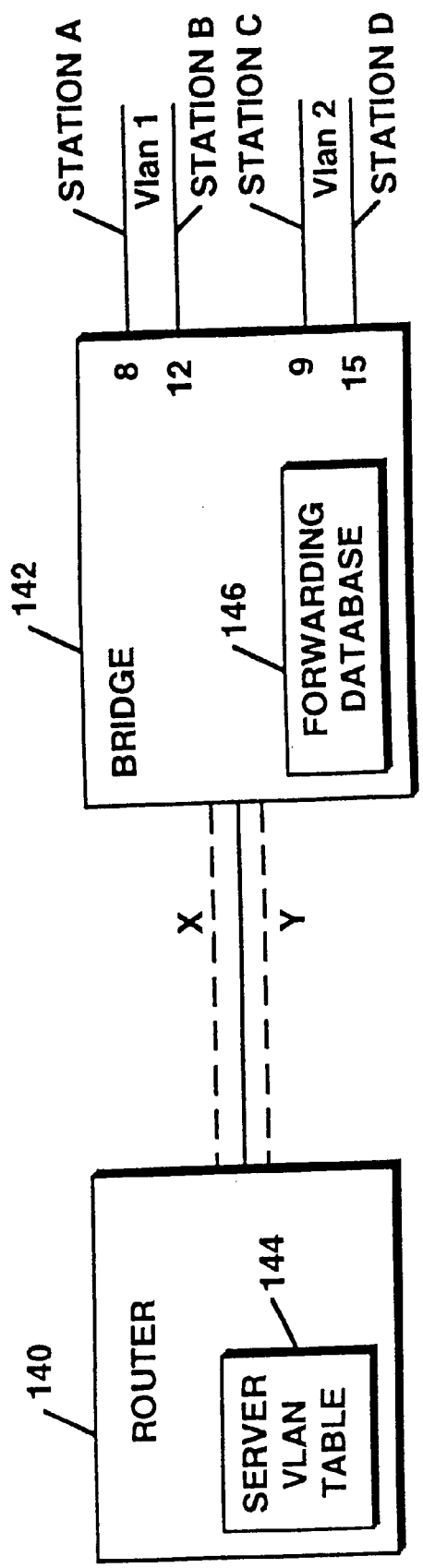
FIG. 4 shows a bridge/router configuration that is used to illustrate alternative methods of addressing.

Learning Process 174 sends to all VML Clients all updates that it has used to update Bridge Forwarding Database 172. When a new line to a VML Client comes up, VML Server 164 informs Learning Process 174. Learning Process 174 then begins sending learning updates (corresponding to the current state of Forwarding Database 172) to VML Server 164. VML Server 164 packages this information and sends it to VML client 156. Finally, VML Client 156 uses the updates to build a Source Vlan Table. Recall that the Source Vlan Table, described in connection with FIG. 4, is used by VML Client Layer 156 to demultiplex received packets.

As Learning Process 174 gets new information it does not send a complete copy of the new database; instead it only sends incremental updates. Thus, a complete set of updates is only sent when a line to a VML Client first comes up. Later changes are sent as incremental updates. However, the use of incremental updates requires a reliable transport protocol between the server and client on each line. The transport protocol is responsible for retransmitting each update until an ACK is received from the client.

C. Relationship to Bridge Architecture

For the described embodiment, it is assumed that all VML servers are IEEE 802.1 compliant spanning tree bridges. Thus, there are two ways the Spanning Tree protocol can interact with the VML protocol. VML server 164 can implement a single spanning tree for all Vlans or a separate spanning tree for each Vlan.

In the described embodiment, every VML server 164 implements a single spanning protocol for all Vlans. In other words, each VML server implements the spanning tree protocol on all its links. Once the spanning tree has stabilized, the Vlan ports specified by management will define the breakup of the Extended LAN into Vlans. Similarly, VML server 164 builds a single learning database for the entire bridge and not a separate learning database for each Vlan. As in the bridge architecture, the station addresses are unique over the entire Extended LAN (as opposed to only requiring unique addresses for each Vlan).

IV. A More Detailed Protocol Specification

A. The Client Data Structures

Figure 6:
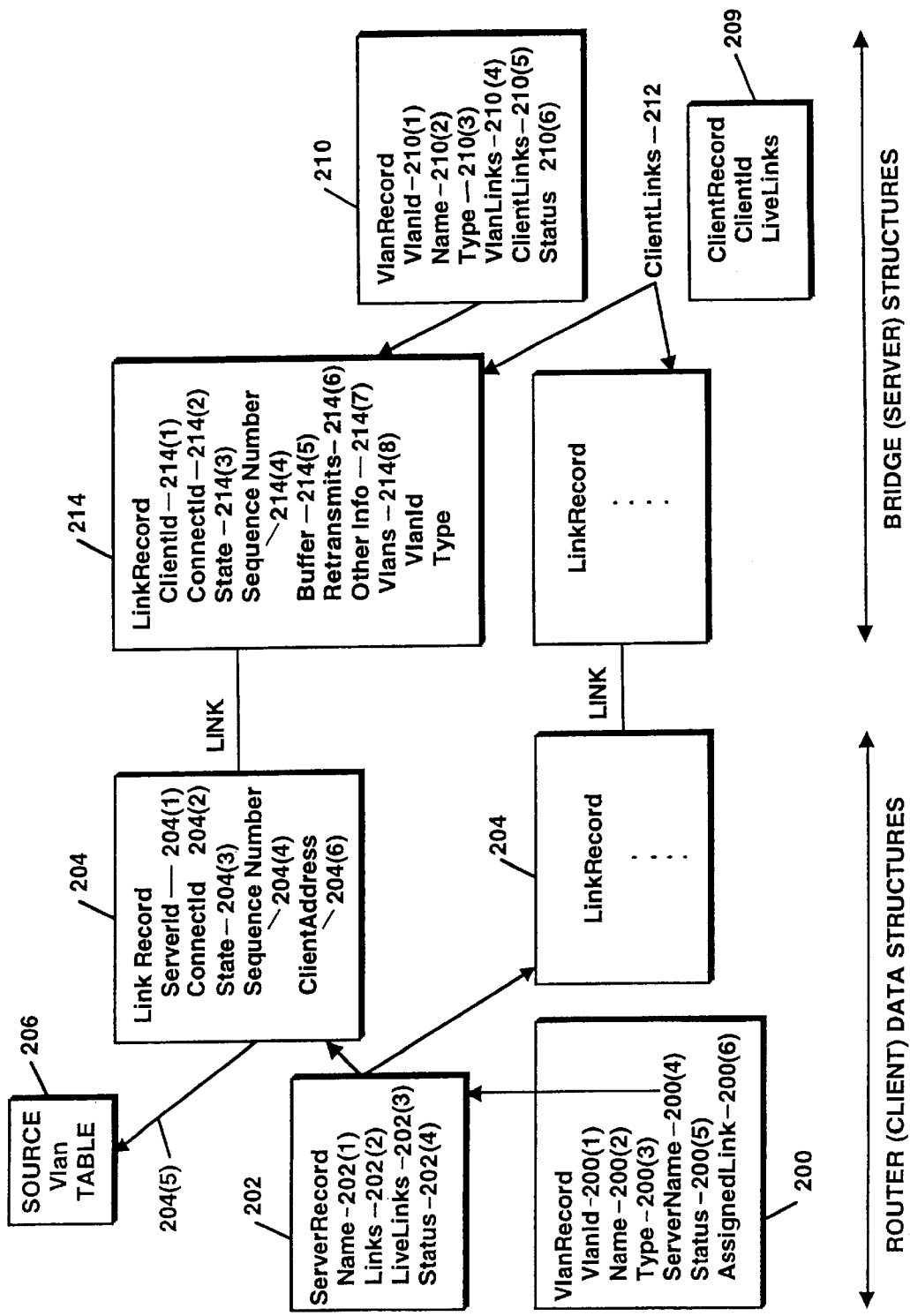
FIG. 6 shows the data structures at the server and at the client.

The principle data structures stored in memory at both client and server are shown in FIG. 6. Considering first the data structures at the client end, there is a VlanRecord 200 for each Vlan declared at the client and there is a ServerRecord 202 for each server that the client knows about. Each VlanRecord 200 points to the Server Record 202 corresponding to the server on which this Vlan belongs. Each ServerRecord 202 points to a set of physical link interfaces that connect the client to the server. Each such link interface has a LinkRecord 204 which contains variables required to implement a reliable transport protocol. The transport protocol is used to send information (from the server to the client) that maps source addresses to Vlans. This mapping information is stored in a SourceVlanTable 206 at the client end. There is one SourceVlanTable 206 per link at the client and it is pointed to by the corresponding LinkRecord 204.

Note that one may use multiple links between the router and the bridge as described in the U.S. Patent Application entitled "SYSTEM FOR ACHIEVING SCALABLE ROUTER PERFORMANCE", by George Varghese, David R. Oran, and Robert E. Thomas, filed on an even date herewith, and which issued as U.S. Pat. No. 5,905,723 on May 18, 1999 and incorporated herein by reference. In that case, there would be multiple LinkRecords.

VlanRecords 200 are linked together in a VlanList. ServerRecords 202 are linked together in a ServerList. And LinkRecords 204 are stored in an array indexed by the link number.

Each of the three records will now be described in greater detail.

1. VlanRecord

Each VlanRecord 200 contains a VlanId 200(1), which identifies the corresponding Vlan at the server; a Name 200(2), which only has local significance and is set according to the manager's convenience; a type 200(3), which identifies the routing type of the Vlan; and a ServerName 200(4), which identifies the name of the server on which this Vlan belongs. These variables are set by management. Each VlanRecord 200 also has two other variables, both of which are set by the protocol, namely, a Status variable 200(5) and an AssignedLink variable 200(6).

Status variable 200(5) indicates if the Vlan is correctly set up and if not, gives an indication of the type of error. The three possible errors are TypeMismatch, if the Vlan type at the client does not match the Vlan type of the corresponding Vlan at the server; IdMismatch, if there is no Vlan at the server with a VlanId equal to that declared at the client end; and ServerFailure, if none of the links to the server are considered operational. AssignedLink variable 200(6) describes the physical interface assigned to this Vlan at the client.

2. ServerRecord

ServerRecord 202 contains two variables that are set by management. The first is a Name variable 202(1) that is a local name assigned by management to this server. A VlanRecord V is made to point to a ServerRecord S by setting V.ServerName=S.Name. The second variable set by management is Links 202(2), a variable that identifies the set of physical interfaces that connect the client to this particular server. FIG. 6 shows two links between the client and the server. Thus, ServerRecord 202 at the client points to the two corresponding link records.

ServerRecord 202 also contains two other variables that are set by the protocol. First, there is a LiveLinks variable 202(3) which is the subset of physical links declared in Links that are operational. The traffic from the client to the server must only be split among the set of LiveLinks. As links fail and recover LiveLinks is updated by the protocol. Finally, there is a State variable 202(4) which describes error conditions. The two possible errors are MultipleServers, if any two links in Links are connected to two distinct servers, and Broadcast, if any link to Links is not a point-to-point link to the server.

3. LinkRecord

Each LinkRecord 204 contains variables required to implement a reliable transport connection with a corresponding link at the server end. Note that if there are multiple links between a client and a server, separate transport connections on each link are set up. ServerId 204(1) is a 48-bit unique Id of the remote server and ConnectId 204(2) is a 32 bit connection identifier. State 204(3) is the state of the connection; the link is considered to be operational when the connection state is ON. SequenceNumber 204(4) is the number of the last update successfully received from the server. Each LinkRecord contains a pointer to a SourceVlanTable 206 that is used to map source addresses of received unicast packets to the Vlan on which the packet was sent. Finally, a ClientAddresses variable 204(6) is a list of addresses used by all VML clients on the same server, as reported by the server.

A more comprehensive description of the client data structures can be found in the pseudocode that is presented in Appendix I, attached hereto. The description uses the simple data types that are described Appendix III, also attached hereto.

B. Server Data Structures

As at the client, the server keeps a VlanRecord 210 for every Vlan declared at the server. The server also has a variable called ClientLinks 212 that lists the set of server links that are connected to clients. For each such link, the server keeps a LinkRecord 214 that has more fields than the corresponding LinkRecord 204 kept at the client. Finally, just as the client keeps a ServerRecord 202 for each server, the server keeps a ClientRecord 209 for each client it knows about. The ClientRecord information is useful in implementing hunt groups at the server. For further discussion of hunt groups as they apply to the bridge see U.S. patent application Ser. No. 07/542,856, entitled Fast Arbiter Having Easy Scaling for Large Numbers of Requesters, Large Numbers of Resource Types with Multiple Instances of Each Type, and Selectable Queuing Disciplines, incorporated herein by reference).

These data structures will now be described in greater detail.

1. VlanRecord:

VlanRecord 210 includes VlanId, Name, and Type fields 210(1), 210(2), and 210(3) the contents of which are declared by management just as at the client end. However, at the server end, management also specifies VlanLinks 210(4) which is the set of bridge links that belong to this Vlan. There are also two variables set by the protocol, namely, a ClientLinks variable 210(5) and a Status variable 210(6). ClientLinks 210(5) is a subset of the server variable ClientLinks that represents the client links to which this Vlan has been assigned. If there are multiple links between a server and a client, the client assigns each Vlan to exactly one operational link. Each client reports the link to which it assigns Vlan V to the server, and the server stores the set of assigned links to ClientLinks 210(5). Status variable 210(6) is identical to Status variable 200(5) found in a client VlanRecord 200.

2. LinkRecord

LinkRecord 214 includes a ClientId variable 214(1), a ConnectId variable 214(2), a State variable 214(3), a SequenceNumber variable 214(4), all corresponding to previously described similar variables in the client LinkRecord. Server LinkRecord 214 also includes additional variables. First, there is a Buffer variable 214(5) which is a buffer that stores the current update being transmitted on the link to the server. There is a Retransmits variable 214(6) that counts the number of times the update stored in Buffer variable 214(5) has been retransmitted to the client without receiving an acknowledgement. There is an Other Info field 214(7) that contains various 48-bit addresses that are used by the client. Finally, there is a Vlans variable 214(8) that identifies the Vlans that are assigned to the link.

3. ClientRecord

Just as in a ServerRecord at the client, each ClientRecord 209 stores a ClientId and a LiveLinks variable which represents the set of links to this client that are considered to be operational.

A formal description of the server data structures can be found in Appendix II, attached hereto.

C. Message Formats

There are four basic types of messages used by the VML protocol. First, servers send ServerHello messages and clients respond with ClientHello messages. These messages are used to set up the transport connections on links and also to coordinate Vlan information between client and server. Next, servers send Update messages to clients containing mapping information that is used by clients to update information in the SourceVlanTable of each link. Each Update message is numbered with a sequence number and clients respond to Updates by sending an ACK.

The relevant fields in each message are shown in Appendix IV, which presents only a logical view of the message formats. For example, in order to encode a variable length sequence (such as a set of VlanRecords), a length field is also needed.

For the most part, the fields of the messages shown in Appendix IV correspond to fields of similar names in the link records at client and server. The relevant state variables are copied into fields of the same name in the protocol message. Thus, all fields in the client hello (except the PhaseIV Address in the case of the DECnet Phase IV communication protocol) are copied from fields of the same name in the corresponding link record at the client. The PhaseIV Address is copied from a global client variable that represents the 48-bit address corresponding to the PhaseIV address of the client (i.e., Phase IV address prefixed by HI-ORD). If the client has no Phase IV address, this field is set to all 0's.

Similarly, all fields except ClientAddresses in the server hello are copied from fields of the same name in the corresponding link record at the client. The ClientAddresses field is copied from a global server variable that represents all the 48-bit addresses reported by clients.

Each update carries the Server Id, the connection identifier, a sequence number and the actual data. The ACK has the same fields except for the data field.

V. A Protocol for Controlling Vlans

A. Setting Up Transport Protocol Connections Using Hellos

Figure 7B:
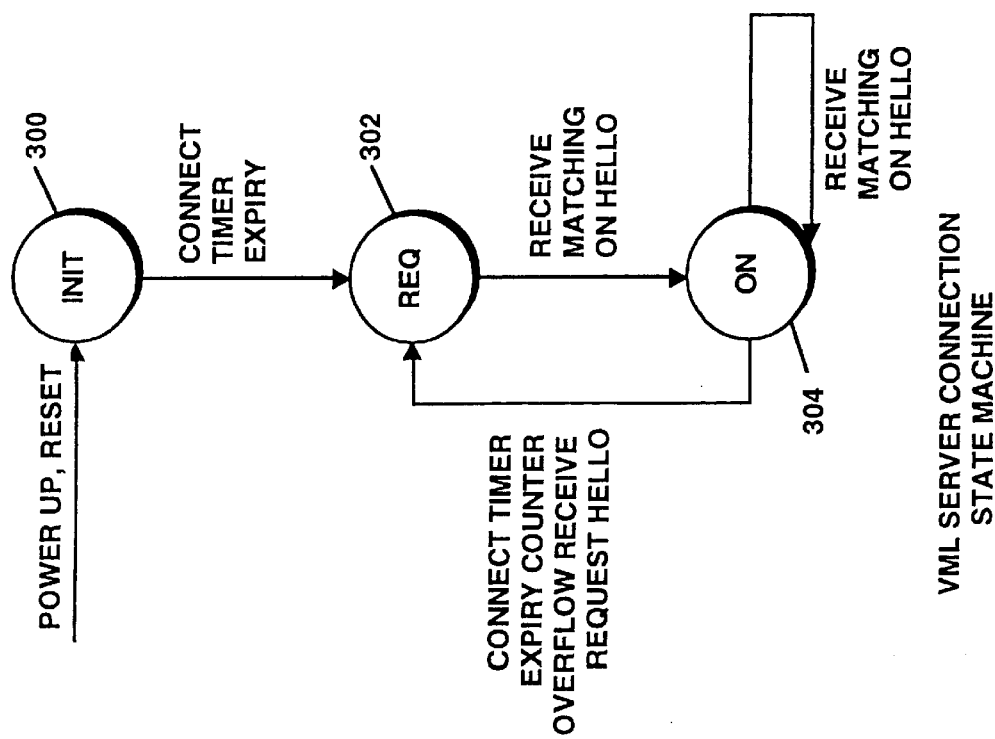
FIGS. 7a and 7b show the client and server state machines, respectively.
Figure 7A:
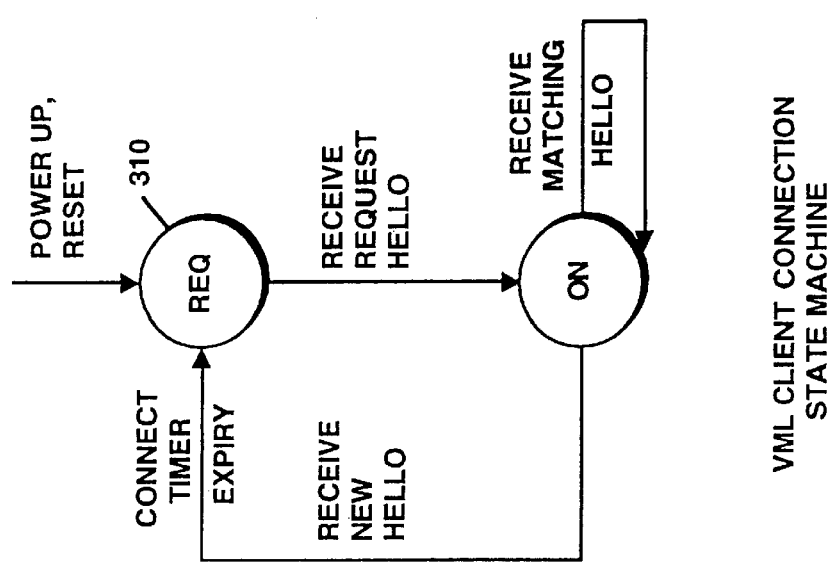

The state machine used for the transport protocol is shown in FIGS. 7a–b. State machines attempt to set up a transport connection on each link between a client and a server. Once management declares a ClientLink at the server, the server creates a LinkRecord for the link. On creation and on power up or reset of the link, the LinkRecord is reset by setting the State of the link to INIT 300. The INIT state causes a wait for a timeout period that is sufficiently long such that by the time the server link exits INIT state: (1) all old control messages sent by the server and the client on this link will have disappeared (any control messages received by the server on a link in INIT state are ignored); and (2) the client will have timed out all old state information it had.

Thus, the timer in INIT state (called ConnectTimer) is set to be large enough to "flush" all old messages and state information. On expiry of the ConnectTimer, the server sets the state of the link to REQ 302 (i.e., requesting a connection) and sends a server hello periodically to the client. All hellos sent by the server list the Vlan Id and type of all Vlans known to the server. All hellos (sent by either the client or server) carry the state of the sender; a Hello with state REQ is called a RequestHello; a Hello with state ON is called an OnHello.

If the client receives a RequestHello while in REQ state, the client transitions to an ON state 304 and sends back an OnHello. While the server periodically sends hellos in the REQ and ON state, the client only sends hellos in response to server hellos. The client is responsible for distributing the Vlans heard from a server among the multiple lines going to the server that are ON. It is also useful for deciding which links multicast traffic for a Vlan will flow on. The client distributes Vlans by setting the variable AssignedLink in a VlanRecord to point to the assigned link. A simple policy would be to distribute the Vlans in roughly equal fashion among all links to the server that are ON.

Having distributed the Vlans among links to the server, the client sends back a hello to the server on the link it received a hello. The client hello lists all Vlans assigned by the client to this link. Notice that the server lists all its Vlans in its hellos, while the client lists the Vlans assigned to the line on which the hello is sent.

Suppose an OnHello comes back on link L to the server. Suppose the hello is received while the server link record is in REQ state and the connection Id in the hello matches the server connectionId. Then the two way handshake to set up the connection is considered to be complete, and the server changes the state of the link to ON state 304. Also if a Vlan V is mentioned in the hello sent by the client, then the server updates the VlanRecord for V to include L in its list of ClientLinks. The ClientLinks for a Vlan is a subset of the ClientLinks of the server. Basically, when a server has multiple links to a client, the server selects exactly one of these links for each Vlan based on hellos sent by the client. The selected link is used by the server to send multicast traffic for the Vlan to the client.

In normal operation, once both client and server have turned a link ON, the server periodically sends hellos to the client and the client responds with a hello. However, if the client does not hear a hello from the server for a timeout period, the client transitions the link to REQ state 310. The default value of the timer in INIT state at the server is chosen to be three times as large as the client timeout.

Besides the normal operation, there are two other interesting cases. First, if the client receives a Hello from the server with a new connection Id or server Id (i.e., if the old server is disconnected and a new server plugged in) while in ON state, the client remains in ON state but essentially starts a new connection. If the client crashes and comes up, the client starts the link in REQ state. However, the client will not leave REQ state until the server sends an OnHello to the client and the client responds with a RequestHello. Receipt of the RequestHello causes the server to go into REQ state and restart the connection. This is important because when the client crashed it may have lost all previous updates; thus it must force the server to send it all updates by restarting the connection.

B. Mapping Client 48-bit Addresses

The hellos sent by the client also lists the 48-bit addresses used by the client on the link, including any address derived from the client address. When the server gets the hello it sets up all bridge forwarding Databases such that the address listed in the hello point to the link the hello was received on.

The VMLServer also builds up a list of all client addresses (using a variable ClientAddresses) that it reports back to clients in its server hellos. Note that if a client R sends a packet to another VML Client router S, client R then includes a VlanId in the packet. Client R can distinguish packets sent to other VML Clients by consulting a list of client addresses sent to R by the server.

C. Consistency Checking

Recall that the manager enters information at both client and server to set up Vlans. The code has a few consistency checks on this information.

Recall that the server sends a list of all its Vlans in its hellos with VlanId and Type. Consider a Vlan V declared at the client with VlanId=I. The client will not assign Vlan V to a line unless it finds that the server reports some Vlan with VlanId=I in its hello. Thus, if the manager incorrectly enters the VlanId field for a Vlan at the server and client, the client will not "bring up" the Vlan. Instead the State of Vlan V is reported as IdMismatch.

Suppose by accident, the manager connects a client to two different servers using links L1 and L2 but declares L1 and L2 to be part of one server record at the client. The client will detect this since it receives hellos with two different Server Ids on both links. The State of the corresponding server record is set to MultipleServers and all Vlans that belong to this server have their State changed to ServerFailure.

If the State of a Vlan is anything other than ON, the client will not send any traffic on this Vlan and will not assign this Vlan to any link.

D. Formal Code for Controlling Vlans at Server

The formal code used by the server to control Vlans is presented in Appendices V, VI, and VII. Appendix V shows the timers, constants, and macros used by the server transport protocol on each link. The code describes the timers as constants.

When a client hello is received on a link, the information in the link record for that link may change and the macros shown in Appendix VI are used to update information about Vlans, Clients, and addresses. The first macro UpdateClientList keeps track of the client links associated with each distinct client (some clients may be connected to the server with multiple links); if hunt groups are implemented, this information is used to create a single hunt group for all the ON links connected to each client. UpdateVlanStatus is used to choose at most one assigned link per client for each Vlan; the assigned link is the link on which the client reports the Vlan. This information is gathered into a set of client links for each Vlan that is used to forward multicast traffic. (Exactly one copy of a multicast packet sent on a Vlan is sent to each client by sending the packet to the assigned link for that client.)

Finally, UpdateAddresses (in Appendix VI) updates the set of 48-bit addresses reported by clients. It also makes forwarding database entries for these addresses.

In the formal code for the server transport protocol (Appendix VII), when some action on a link L is executed, it typically begins by obtaining the LinkRecord by looking up LinkArray[L]. It is, of course, assumed that there is a check as to whether L is a ClientPort and if L is not, the routine is not executed.

The server code describes actions taken when a hello is received and transport timers expire. It follows the state transitions described earlier.

E. Formal Code for Controlling Vlans at Client

The client code to control Vlans is described in Appendices VIII and IX. Appendix VIII contains a set of useful macros that are called by the client transport protocol. InitializeConnection is called when a connection first begins at a client and initializes transport variables. UpdateServerRecord and UpdateVlanStatus are called whenever the client receives a new server hello.

UpdateServerRecord checks for server errors (such as being connected to two different servers on two links that were declared to be part of one server record) and updates the concerned server record. UpdateVlanStatus similarly checks for Vlan errors (i.e., a Vlan declared at the client does not have a matching Vlan at the server) and also distributes client Vlans among all the ON lines that connect the client and the server.

Finally, the main client code is described in Appendix IX. It has routines to process a received server hello and for handling transport timer expiry. It follows the state machine described earlier.

F. Sending Updates Reliably Over Transport Connections

This section describes how the forwarding tables at the server are sent reliably to the client using the transport connections set up on links.

As was previously described, when the server turns a link ON, the server initializes the SequenceNumber field (for the link) to 1. Similarly when the client starts a connection, the client initializes the SequenceNumber field to 0. The client also initializes its SourceVlanTable to be empty.

In normal operation, the server will send its forwarding table suitable encoded to the client on each line. The client will send ACKs backs separately on each line. This is redundant because if a client has multiple lines to the server it really only needs one copy of the Forwarding table. However, by sending multiple copies parallel processing is possible.

When a connection starts at the server, the server informs the Update Process using a routine called InformUpdateProcess together with a status variable that is set to "new". It is assumed that the Update Process keeps track of the outstanding updates on each client link. When the Update Process gets a status of new for a line, it begins to send the entire Forwarding Database to the client as a sequence of updates. However, the update process sends only one update at a time. Each update is numbered with the server sequence number; when the client receives the update, the client incrementally updates its SourceVlanTable using the update and sends back an ACK. When the ACK is received at the server, the server informs the Update Process using the routine InformUpdateProcess together with a status variable that is set to free. When this happens the Update Process sends the next outstanding update. If the forwarding database changes while the client is being loaded, the UpdateProcess must keep track of the outstanding updates for each client link.

The current update being sent to a client is stored in a variable called Buffer. If an ACK is not received before a RetransmitTimer expires, the update is retransmitted from Buffer. If more than a certain number of retransmissions takes place, the server starts a new connection by going into REQ state and incrementing the connection identifier.

The net result is that on each line, the client will build up a SourceVlanTable that maps source 48-bit addresses to Vlans.

1. Code for Sending Updates Reliably at the Server

The server code for sending updates reliably is described in Appendix X. It uses a macro that is an interface to the update process. It has routines to send a new update, to retransmit an update, and to receive an ACK from the server.

2. Code for Sending Updates Reliably at the Client

The client code for receiving updates reliably and sending updates is described in Appendix XI. It uses a macro that encapsulates the implementation specific method used to update the SourceVlanTable when a new update arrives. The code has only one routine, a routine that receives an update, checks whether it is a duplicate, and sends an ACK back to the server.

G. Forwarding Packets Between Vlans

1. Client Forwarding

Normally the interface to a Data Link is via a port. According to a simplified view of a port interface, a client opens a port and is given a descriptor (much like a Unix file descriptor). The client then enables a certain protocol specifier (includes information on SAPs, Protocol Types, multicast etc.) on the port. The specifier describes the kinds of packets the client wants to receive. Finally, clients can transmit packets to the port; these packets are then sent out on the link. Also received packets of the specified type are queued to the port.

The actual DNA Data Link specifications are slightly different; for instance, the client does not give the port a single protocol specifier but instead separately enables each SAP, protocol type, etc. Also, the interface to receive a packet is typically a polling interface. However, these are just details.

One object is to make a Vlan look just like a LAN to clients and a similar port interface is offered to Vlans except that the ports on a Vlan are called VlanPorts to avoid confusion. Thus a routing protocol (e.g. Phase V DECNET) begins by opening a virtual port on a specified Vlan. Then the routing protocol enables a single protocol specifier on the virtual port which describes all the kinds of packets that the routing protocol wishes to receive. Finally, the routing protocol transmits to the VlanPort and received packets are queued to the VlanPort.

When a virtual port is opened and given a protocol specifier, the VML layer at the client attempts to open up corresponding ports on all the physical links associated with this Vlan. Thus each Vlan has a server and each server has a set of physical links. The Client VML Layer opens up Data Link ports on each such link and enables each such Data Link port with the specifier of the VlanPort. The client stores the mapping between VlanPorts and Data Link ports in the PortMappingList. This list consists of a record for each association between a VlanPort and a Data Link port. Thus each VlanPort has multiple records in the PortMappingList, one for each Data Link port it is associated with.

The routing protocol can choose to open a port to the unknown Vlan. In this case, the client opens associated physical ports on all server links.

When forwarding a packet sent on VlanPort VP on Vlan V, the client first picks a link L among all the "live" links associated with Vlan V. These are the links associated with V's server that are in ON state. Next, the client searches the PortMapping list to find the Data Link port LP associated with L. If the packet is multicast or is destined to another VML client, a VlanId field is added to the packet. Finally the packet is queued to Data link port LP.

When a packet is received on link L with protocol specifier S, the client attempts to find the Vlan V the packet was sent on by first looking for a VlanId field (if it exists) and then consulting the SourceVlanTable (if packet is unicast). If such a V is found, the client searches the PortMappingList to find the VlanPort VP associated with Vlan V and specifier S; the client then queues the packet to VP. If no such V is found, the client searches the PortMappingList to find the VlanPort VP associated with the "unknown" Vlan and specifier S. If such a port exists, the client queues the packet to VP.

2. Server Forwarding

The server forwarding algorithm is essentially the bridge forwarding algorithm except for small changes to the way a server forwards: a) multicast packets and b) packets sent to an unknown destination address.

The Vlan associated with a received multicast packet P is determined by the type of link P was received on. If P was received on a client link, the Vlan is determined from the VlanId field in P. If P was received on a client link, the Vlan is determined from the VlanId field in P. If P was received on a Vlan link L, the Vlan is determined from the Vlan that link L has been declared to be part of.

Multicast packets sent on a Vlan V are forwarded only to Vlan links associated with V and to client links that report Vlan V in their client hellos. Before a multicast packet is sent on a client link, a VlanId field is added; similarly when a multicast packet is received from a client link, the VlanId field is removed before the packet is sent to Vlan links.

Packets with unknown destination address that are received on client links are sent to all Vlan links that are turned on in the spanning tree. Packets with unknown destination address that are received on a Vlan link are sent only on the Vlan associated with that link. Packets with unknown destination address are never sent on client links. This is because client hellos list all addresses of clients; hence client destination addresses should be unknown only during the (hopefully brief) period when the protocol initializes.

3. Server Code for Forwarding

The server code for forwarding packets is formally described in Appendices XII and XIII. The main server forwarding routines are in Appendix XIII. The two main routines are MULTICAST_FORWARD (which describes how multicast packets are forwarded) and UNKNOWN_FORWARD (which describes how packets with unknown destination addresses are forwarded). Appendix XII describes the macros used by the main code in Appendix XIII. The macros are mostly used to find the links associated with Vlans and to add and remove the VlanId field in the packet.

4. Client Forwarding Protocol

The formal code for the client forwarding protocol is described in Appendices XIV and XV. The major routines in Appendix XV are the TRANSMIT routine (to transmit packets on a Vlan, possibly adding a VlanId to a packet) and the RECEIVE routine (to demultiplex a received Data Link packet using either a VlanId field or the source mapping table). Appendix XIV describes the macros used by the main code in Appendix XV. The macros are mostly used to search the PortMappingList.for mappings between virtual ports, link ports, and protocol specifiers.

The SourceLookup macro finds the Vlan associated with a source address. It uses two architectural constants, UnknownVlanId (VlanId of the unknown Vlan) and VML-RouterId (a second VlanId reserved to denote that this Source Address is a VML Router).

The RECEIVE macro finds the Vlan associated with a packet as follows:

If the packet is multicast, obtain Vlan from the VlanId field in packet.

If not multicast:

Look up the source address in SourceVlanTable.

If the result indicates the packet is from a VML Router then find the Vlan from the VlanId field in the packet.

Otherwise use the Vlan returned by the source lookup.

Other embodiments are within the following claims.

What is claimed is:

1. A method of operating a network bridge having a first plurality of ports through which network communications pass to and from the bridge, the method comprising:

assigning a group identifier to each port of the first plurality of ports, wherein all ports with a same assigned group identifier are in a same group;

receiving a communication on a first port of the bridge; and if the first port is one of the first plurality of ports and the communication is a multicast packet having a multicast destination address, sending the communication out of the bridge on all other ports of the first plurality of ports having the same assigned group identifier as the first port.

2. The method of claim 1, further comprising:

identifying a source of the communication received on the first port of the bridge.

3. The method of claim 2, further comprising:

identifying a destination of the communication;

determining a group identifier assigned to the destination; and if the group identifier assigned to the destination and the group identifier assigned to the source are different, sending the communication out a client port not within the first plurality of ports.

4. The method of claim 1, wherein the bridge includes a client port not included within the first plurality of ports and the communication is a multicast packet, the method comprising:

receiving the multicast packet on the client port;

identifying a group identifier within the multicast packet; and sending the multicast packet out on those ports having the same group identifier as the group identifier within the received multicast packet.

5. The method of claim 4, wherein:

the group identifier is removed from the multicast packet before sending the multicast packet out from the bridge.

6. The method of claim 1, further comprising:

assigning a protocol type to each group identifier;

wherein, for each port of first plurality of ports, the protocol type identifies a communication protocol used by a station connected to the port.

7. The method of claim 6, wherein no two distinct group identifiers having a same protocol type are assigned to a same port.

8. The method of claim 1, wherein a port may have more than one group identifier assigned to it.

9. A method of operating a network bridge having a first plurality of ports through which network communications pass to and from the bridge, the method comprising:

assigning a group identifier to each port of the first plurality of ports, wherein all ports with a same assigned group identifier are in a same group;

receiving a communication on a first port of the bridge;

if the first port is one of the first plurality of ports, sending the communication out of the bridge on all other ports of the first plurality of ports having the same assigned group identifier as the first port;

identifying a source of the communication received on the first port of the bridge;

identifying a destination of the communication;

determining a group identifier assigned to the destination; and if the group identifier assigned to the destination and the group identifier assigned to the source are different, sending the communication out a client port not included within the first plurality of ports and indicating the group identifier assigned to the first port within the communication sent out the client port.

10. The method of claim 9, wherein the step of indicating the group identifier comprises:

replacing a redundant field within the communication with the group identifier.

11. A method of operating a network bridge having a first plurality of ports through which network communications pass to and from the bridge, the method comprising:

assigning a group identifier to each port of the first plurality of ports, wherein all ports with a same assigned group identifier are in a same group;

connecting a router to a client port of the bridge not within the first plurality of ports;

identifying the ports on the router connected to the network bridge;

defining, on the router, a correspondence between the identified ports connected to the network bridge and each distinct group identifier;

receiving a communication on a first port of the bridge;

if the first port is one of the first plurality of ports, sending the communication out of the bridge on all other ports of the bridge having the same assigned group identifier as the first port;

identifying a source of the communication received on the first port of the bridge;

identifying a destination of the communication;

determining a group identifier assigned to the destination; and if the group identifier assigned to the destination and the group identifier assigned to the source are different, sending the communication out the client port.

12. The method of claim 11, further comprising:

receiving a second communication from the bridge at the router; and determining a group identifier of the second communication.

13. The method of claim 11, further comprising:

sending a second communication from the router to the bridge, wherein the second communication comprises a first group identifier, and wherein the second communication comprises a source address of the router assigned to the first group identifier.

14. The method of claim 11, further comprising:

maintaining, at the router, a record of a source address of each communication from the bridge and a respective group identifier.

15. A computer program product for use with a network device having a computer and a first plurality of ports on which network communications pass to and from the network device, wherein the network device includes a client port not within the first plurality of ports, and the computer program product comprises computer program instructions that when executed by the computer direct the computer to perform a method of directing the network communications, the method comprising:

assigning a group identifier to each port of the first plurality of ports, wherein all ports with a same assigned group identifier are in a same group;

receiving a communication on a first port of the network device;

if the first port is one of the first plurality of ports, sending the communication out of the network device on all other ports of the first plurality of ports having the same assigned group identifier as the first port;

receiving a multicast packet having a multicast destination address on the client port;

identifying a group identifier within the multicast packet; and sending the multicast packet out on those ports having the same group identifier as the group identifier within the received multicast packet, wherein the group identifier is removed from the multicast packet before sending the multicast packet out from the network device.

16. The computer program product of claim 15, wherein the method further comprises:

identifying a source of the communication received on the first port.

17. The computer program product of claim 16, wherein the method further comprises:

identifying a destination of the communication;

determining a group identifier assigned to the destination; and if the group identifier assigned to the destination and a group identifier assigned to the source are different, sending the communication out a client port not within the first plurality of ports.

18. A computer program product for use with a network device having a computer and a first plurality of ports on which network communications pass to and from the network device, the computer program product comprising computer program instructions that when executed by the computer direct the computer to perform a method of directing the network communications, the method comprising:

assigning a group identifier to each port of the first plurality of ports, wherein all ports with a same assigned group identifier are in a same group;

receiving a communication on a first port of the network device;

if the first port is one of the first plurality of ports, sending the communication out of the network device on all of the ports of the first plurality of ports having the same assigned group identifier as the first port;

identifying a source of the communication received on the first port;

identifying a destination of the communication;

determining a group identifier assigned to the destination; and if the group identifier assigns to the destination and the group identifier assigned to the source are different, sending the communication out a client port not within the first plurality of ports, indicating the group identifier of the first port within the communication sent out the client port and replacing a redundant field within the communication with the group identifier.

* * * * *

UNITED STATES PATENT AND TRADEMARK OFFICE
CERTIFICATE OF CORRECTION

| | | |
|---|---|---|
| PATENT NO. | : 6,560,236 C1 | |
| APPLICATION NO. | : 90/008552 | |
| DATED | : August 2, 2011 | |
| INVENTOR(S) | : George Varghese et al. | |

It is certified that error appears in the above-identified patent and that said Letters Patent is hereby corrected as shown below:

In claim 24, at column 2, line 21 replace "idnetifier" with -- identifier --.

Signed and Sealed this
Twenty-seventh Day of September, 2011

David J. Kappos
*Director of the United States Patent and Trademark Office*

(12) EX PARTE REEXAMINATION CERTIFICATE (8442nd)
United States Patent
Varghese et al.

(10) Number: US 6,560,236 C1
(45) Certificate Issued: Aug. 2, 2011

(54) VIRTUAL LANS

(75) Inventors: George Varghese, Bradford, MA (US); John Bassett, Reading (GB); Robert Eugene Thomas, Hudson, MA (US); Peter Higginson, Herts (GB); Graham Cobb, Farnham (GB); Barry A. Spinney, Wayland, MA (US); Robert Simcoe, Westboro, MA (US)

(73) Assignee: Enterasys Networks, Inc., Andover, MA (US)

Reexamination Request:
No. 90/008,552, Mar. 26, 2007

Reexamination Certificate for:
Patent No.: 6,560,236
Issued: May 6, 2003
Appl. No.: 09/411,773
Filed: Oct. 4, 1999

Related U.S. Application Data

(63) Continuation of application No. 08/731,905, filed on Oct. 22, 1996, now Pat. No. 5,963,556, which is a continuation of application No. 08/081,622, filed on Jun. 23, 1993, now abandoned.

(51) Int. Cl.
*H04L 12/46* (2006.01)
*H04L 12/18* (2006.01)

(52) U.S. Cl. .................................. 370/401; 370/432
(58) Field of Classification Search .................. None
See application file for complete search history.

(56) References Cited

U.S. PATENT DOCUMENTS

| | | |
|---|---|---|
| 4,058,672 A | 11/1977 | Crager et al. |
| 4,348,554 A | 9/1982 | Asmuth |
| 4,419,728 A | 12/1983 | Larson |
| 4,439,636 A | 3/1984 | Newkirk et al. |
| 4,481,626 A | 11/1984 | Boggs et al. |
| 4,574,346 A | 3/1986 | Hartung |
| 4,577,313 A | 3/1986 | Sy |
| 4,627,052 A | 12/1986 | Hoare et al. |
| 4,651,318 A | 3/1987 | Luderer |
| 4,701,906 A | 10/1987 | Ransom et al. |
| 4,707,827 A | 11/1987 | Bione et al. |
| 4,823,338 A | 4/1989 | Chan et al. |

(Continued)

FOREIGN PATENT DOCUMENTS

| | | |
|---|---|---|
| EP | 0228634 | 7/1987 |
| EP | 0253421 | 1/1988 |
| EP | 0260043 | 3/1988 |

(Continued)

OTHER PUBLICATIONS

Bonomi, Flavio and Fendick, Kerry W., The Rate–Based Flow Control Framework for the Available Bit Rate ATM Service, IEEE Network, Mar./Apr. 1995 pp. 25–39.

Cohen, Jodi, VLANs Set to Enhance Their Value Through Policy–Based Management, Local Networks, Aug. 14, 1995, p. 23.

Goldberg, Michael, Stratus Computer Turns on Radio, A Fault–Tolerant Server, Computer World, Workgroup Computing, Oct. 30, 1995, p. 59.

(Continued)

*Primary Examiner* — Woo H. Choi

(57) ABSTRACT

A network device for interconnecting computer networks, the device including a bridge having a plurality of ports through which network communications pass to and from the bridge, the bridge also including a first interface enabling a user to partition the plurality of bridge ports into a plurality of groups, wherein each group represents a different virtual network, wherein the bridge treats all ports within a given group as part of the virtual network corresponding to that group and the bridge isolates the virtual networks from each other, whereby any communications received at a first port of the bridge are directly sent by the bridge to another bridge port only if the other bridge port and the first bridge port are part of the same group.

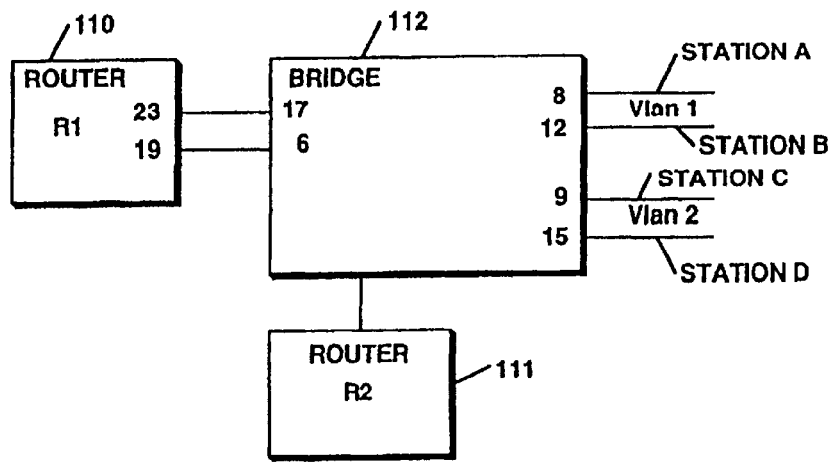

U.S. PATENT DOCUMENTS

| | | | |
|---|---|---|---|
| 4,894,822 A | 1/1990 | Buhrke et al. |
| 4,894,826 A | 1/1990 | Aggers et al. |
| 4,897,874 A | 1/1990 | Lidinsky et al. |
| 4,912,656 A | 3/1990 | Cain et al. |
| 4,922,486 A | 5/1990 | Lidinsky et al. |
| 4,937,856 A | 6/1990 | Natarajan |
| 5,056,085 A | 10/1991 | Vu |
| 5,060,228 A | 10/1991 | Tsutsui et al. |
| 5,090,025 A | 2/1992 | Marshall et al. |
| 5,132,926 A | 7/1992 | MacEachern et al. |
| 5,136,580 A | 8/1992 | Videlock et al. |
| 5,168,496 A | 12/1992 | Ohba et al. |
| 5,193,152 A | 3/1993 | Smith |
| 5,220,562 A | 6/1993 | Takada et al. |
| 5,226,039 A | 7/1993 | Frank et al. |
| 5,251,205 A | 10/1993 | Callon et al. |
| 5,265,092 A | 11/1993 | Soloway et al. |
| 5,280,480 A | 1/1994 | Pitt et al. |
| 5,297,143 A | 3/1994 | Fridrich et al. |
| 5,309,437 A | 5/1994 | Perlman et al. |
| 5,311,593 A | 5/1994 | Carmi |
| 5,321,693 A | 6/1994 | Perlman |
| 5,323,394 A | 6/1994 | Perlman |
| 5,345,587 A | 9/1994 | Fehskens et al. |
| 5,355,371 A | 10/1994 | Auerbach et al. |
| 5,379,296 A | 1/1995 | Johnson et al. |
| 5,394,402 A | 2/1995 | Ross |
| 5,396,493 A | 3/1995 | Sugiyama |
| 5,398,242 A | 3/1995 | Perlman |
| 5,444,702 A | 8/1995 | Burnett et al. |
| 5,485,455 A | 1/1996 | Dobbins et al. |
| 5,491,694 A | 2/1996 | Oliver et al. |
| 5,497,368 A | 3/1996 | Reijnierse et al. |
| 5,500,860 A | 3/1996 | Perlman et al. |
| 5,521,910 A | 5/1996 | Matthews |
| 5,530,703 A | 6/1996 | Liu et al. |
| 5,550,816 A | 8/1996 | Hardwick et al. |
| 5,579,480 A | 11/1996 | Cidon et al. |
| 5,583,996 A | 12/1996 | Tsuchiya |
| 5,606,669 A | 2/1997 | Bertin et al. |
| 5,610,904 A | 3/1997 | Eng et al. |
| 5,617,421 A | 4/1997 | Chin et al. |
| 5,623,605 A | 4/1997 | Keshav et al. |
| 5,633,869 A | 5/1997 | Burnett et al. |
| 5,636,371 A | 6/1997 | Yu |
| 5,644,571 A | 7/1997 | Seaman |
| 5,684,800 A | 11/1997 | Dobbins et al. |
| 5,699,347 A | 12/1997 | Callon |
| 5,734,824 A | 3/1998 | Choi |
| 5,734,865 A | 3/1998 | Yu |
| 5,740,171 A | 4/1998 | Mazzola et al. |
| 5,741,171 A | 4/1998 | Sarfaty et al. |
| 5,752,003 A | 5/1998 | Hart |
| 5,796,727 A | 8/1998 | Harrison et al. |
| 5,796,736 A | 8/1998 | Suzuki |
| 5,825,772 A | 10/1998 | Dobbins et al. |
| 5,862,338 A | 1/1999 | Walker et al. |
| 5,881,243 A | 3/1999 | Zaumen et al. |
| 5,892,910 A | 4/1999 | Safadi |
| 5,892,912 A | 4/1999 | Suzuki et al. |
| 5,946,308 A | 8/1999 | Dobbins et al. |
| 5,963,556 A | 10/1999 | Varghese et al. |
| 6,005,864 A | 12/1999 | Krause |
| 6,016,306 A | 1/2000 | Le Boudec et al. |
| 6,041,166 A | 3/2000 | Hart et al. |
| 6,119,171 A | 9/2000 | Alkhatib |
| 6,128,665 A | 10/2000 | Iturralde |
| 6,151,319 A | 11/2000 | Commety et al. |
| 6,151,324 A | 11/2000 | Belser et al. |
| 6,269,404 B1 | 7/2001 | Hart et al. |
| 6,426,954 B1 | 7/2002 | Krause |
| 6,560,236 B1 | 5/2003 | Varghese et al. |
| 6,711,171 B1 | 3/2004 | Dobbins et al. |

FOREIGN PATENT DOCUMENTS

| | | |
|---|---|---|
| EP | 0282198 | 9/1988 |
| EP | 0161031 | 7/1989 |
| EP | 0609990 A2 | 8/1994 |
| EP | 0405042 | 9/1994 |
| EP | 0480555 | 9/1996 |
| GB | 2268376 | 1/1994 |
| JP | 61-253952 | 11/1986 |
| JP | 63-222538 | 9/1988 |
| WO | WO 95/01023 | 1/1995 |
| WO | WO 95/04420 A3 | 2/1995 |
| WO | WO 95/04420 A2 | 2/1995 |
| WO | WO 96/18451 | 6/1996 |
| WO | WO 96/18629 | 6/1996 |

OTHER PUBLICATIONS

Kung, H.T. and Morris, Robert, Credit–Based Flow Control for ATM Networks, IEEE Network, Mar./Apr. 1995, p. 40–48.

Lawton, Stephen, Digital Unveils Virtual LAN Architecture, Digital News & Review, Apr. 24, 1995, pp. 9–10.

Ramakrishnan, K. K. and Newman, Peter, Integration of Rate and Credit Schemes for ATM Flow Control, IEEE Network, Mar./Apr. 1995, pp. 49–56.

Stankovic, John A., Spuri, Marco, Di Natale, March and Buttazzo, Giorgio C., Implications of Classical Scheduling Results for Real–Time Systems, IEEE Network, Jun. 1995, pp. 16–25.

Comer, Internetworking with TCP/IP, vol. 1. Principals, Protocols and Architecture. Prentice Hall, New Jersey, 2nd Edition, Chapter 16, pp. 165–280.

F. Baker, "Point–to–Point Protocol Extensions for Bridging," Request for Comments, 1220 Apr. 1991.

Deering, "Host Extensions for IP Multicasting," Request for Comments, 1112 Aug. 1989.

"Media Access Control (MAC) Bridges" Institute of Electrical and Electronics Engineers, Inc. 802.1D–1990.

Youchi Ohteru, Interconnecting IEEE 802 LANs by a Wideband Backbone Network, 12th Conf. on Local Computer Networks, IEEE Computer Society, Oct. 5–7, 1987.

Petrosky, M., "Switching Strategy Will be Key as Internet Markets Collide," Network World, 11(8); p. 34, Feb. 21, 1994.

MacAskill, S., "Cableton Preps Modules for MMAC–Plus Hub," Network World, 11, 18; p. 32, May 2, 1994.

Hemmady, J.G., "Metropolitan Area Network Generic Framework System Requirements in Support of Switched Multi–Megabit Data Service," Bellcore Technical Advisory TA–TSY–000772 Bell Communications Research, Part 1, pp. 1–1–12–1, Feb. 1988.

Catalyst 1200 Installation and Configuration Guide, vol. 7, No. 1. 1995.

Cheriton, D.R., "Sirpent: A High–Performance Internetworking Approach," Sigcomm '89 Symposium, Communications Architectures & Protocols, Sep. 19–22, 1989.

Computer History Museum: Where Computing History Lives, Mar. 30, 2006, <http://www.computerhistory.org/>.

Emigh, J., "DECWorld: DEC Intros High–Speed Networking Gigaswitch"—Product Announcement, Newsbytes News Network, May 7, 1992.

Morency, J. et al., "Virtual LANs Promise Big Gains, Pose New Risks," Network World, May 2, 1994.

Ohteru, Y., "Interconnecting IEEE 802 LANs by a Wideband Backbone Network," IEEE, 1987.

Bell Communication, "Generic System Requirements IS0 Switched Multi–Megabit Data Service," Bellcore Technical Reference, Issue 1 (May 1991).

IEEE 802.1 Working Group, IEEE 802.1—1995 Document Register (1995).

"Bridges vs. Routers: Comparing Functionality, How are bridges and routers and integrated functionality bridge/routers being used to meet the demands of today's internetworking environment?", Telecommunications, Americas Edition Vo. 27, No. 4 (Apr. 1993).

"Broadband Future Faces Snarls and Gnarls," Business communications Review (Dec. 1993).

Constellation Product Schedule (Apr. 22, 1992).

Constellation Series: Little Dipper—Multipart Internetworking (Clearpoint Research Corporation).

Constellation Series: Multiprotocol Routing—From Constellation.

Interoffice Memorandum from Ellen Minter regarding Education and Science, "Education and Science: Advancing Knowlege and Innovation," IBU DECWORLD Update (Mar. 3, 1992).

"Welcome to the VLAN Router historical gallery!" (Apr. 7, 2006).

"Crescendo, Kalpma, and Alantec, Third party networking add ons for SPARC servers," Sun Microsystems, Inc., (1992).

German Article: Netwerke—Die Informationstranporter der Moderne (1993).

IP Packet Structure.

"Clearpoint Demonstrates Frame Relay Support in Interop Frame Relay Solutions Showcase TCPIIP Support Also Features," Press Release (Sep. 23, 1991).

Digital GIGAswitch/Router User Reference Manual—Part No. : 32684–03 (Dec. 1999).

Foundry Networks, Foundry EdgeIron Users Guide—Chapter 21: 802.1Q VLANs (Mar. 2005).

"BigIron Packet Flow," Foundry Networks.

"Scalable Hardware for the Internet Future," Foundry Networks System Architectures (Oct. 11, 1995).

Auerbach et al., Multicast Group Membership Management in High Speed Wide Area Networks.

Backes, Floyd, "Spanning Tree Bridges—Transparent Bridges for Interconnection of IEEE 802 LANs", IEEE Network: The Magazine of Computer Communications, vol. 2, No. 1, 5–9 (Jan. 1988).

Baker, F., Network Working Group, Point to Point Protocol Extensions for Bridging (Apr. 1991).

Biagioni, et. al., "Designing a Practical ATM LAN—Appropriately designed ATM LAN Switches and interface cards are providing customers with high–performance plug–and–play replacements for existing LANs" (Mar. 1993).

Bichard, Jean Phillipe; French Article: Decouper le reseau en segrnets autonomes.

Braden, R. et al., Requirements for Internet Gateways (Jun. 1987).

Braden, R., Internet Engineering Task Force, Requirement for Internet Hosts—Communication Layers (Oct. 1989).

Bradner & Greenfield, "Manageability, not speed, is crucial among routers," PC Magazine (Mar. 30, 1993).

Broadhead, Steve; "Ungermann–Bass Virtual Networking; Dragon–Switch; Previews; Product Announcement Byline" (Apr. 1993).

Articles—1) Network management products to configure, control, monitor, test, protect, and inventory your enterprise network's resources (Aug. 1991); 2) LAN bridges; networking supplemental product table; buyers guide; 3) Vendors profits; makers of local area network bridges; Directory; buyers guide; 4) ALANTEC; Alantec announces 160 Mbit/second LAN switch; fast internetworking supports high–performance workstations.

Articles—1) Access/One software lets users divede LAN data load; LANs can be split into multiple subnetworks byline by Maureen Molloy (May 4, 1992); 2) Deal with Banyan May Lead Wang Out of Bog byline by John Gantz (Jun. 6, 1988); 3) Now you see it . . . by Mike Hurwicz.

Articles—1) Companies comment on *HP* Open View Release 3.0 announcement (May 11, 1992); 2)Access/One Software lets users divide LAN Data load; LANs can be split into multiple subnetworks byline by Maureen Molly (May 4, 1992); 3) Framework speed: getting a handle on the same relay communications standard; Interfaces by Llana, Andres Jr.; 4) Network hubs evolving to tackle enterprise management by Karyl Scott; 5) Frame relay: private network design issues: A guide to Frame Relay by Jean A. Lorrain; 6) Tallahassee's CMDS: the first FFDI MAN by William M. Price and Jehu F. Westmark; 7) Frame–Relay finished by Malcom Laws; 8) DM, Novell in LAN power play by Joannie Wexler and Jim Nash; 9) Virtual networking/telecommunications by Donald Health; 10) Microtest Lamport: printing and plotting under Net Ware has come a long way by Howard Marks; 11) Network Partitioning: an alternative solution to network management by Doug Somers and Bert Whyte.

Bunn, J.J., "DECCO Project", Trip Report: DECworld, Boston (May 18, 1992).

Camarda, et. al. P., "A Router for the Interconnection of Ethernet Local Area Network Via An ATM Network".

Catania, V., et al., "A Routing Strategy for MAN Interconnection", IEEE, pp. 608–615. (1991).

Chen & Chang, "Efficient multicast source routing scheme," Computer Communications vol. 16, No. 10, 662–666 (1993).

Chen, Helen et al. "Evaluation of Dec's Gigaswitch for Distributed Parallel Computing," (Oct. 1993).

Cheriton, et. al., Draft RFC—"Ethernet Group Membership Protocol (EGMP)" (Oct. 22, 1995).

Cheriton, David, Draft RFC—"Virtual LAN Management Protocol (VLMP)" (Oct. 20, 1995).

Claffy, et. al., "A Parameterizable Methodology for Internet Traffic Flow Profiling," IEEE Journal on Selected Areas in Communications, vol. 13, No. 8 (Oct. 8, 1995).

Crocetti, P., et al., "Multicast in SMDS over an ATM network" Proc. Globecom '92, vol. 2, 1062–66 (1992).

Cullerot, David, "Requirements for VLANs" (Oct. 1995).

Cullerot, David, "Virtual LAN Topology" (Oct. 13, 1995).

Cullerot, David, "Virtual LAN Topology—Diagram" (Oct. 13, 1995).

de Vries, Rein J.F., "ATM Multicast Connections Using the Gauss Switch," Proc. Globecom '90—Communications: Connecting the Future vol. 1,21 (1990).

Decker, E. et al., "Definitions of Managed Objects for Bridges" (Dec. 1991).

Deering, Stephen, "Multicast Routing in Internetworks and Extended LANs," ACM Press: SIGCOMM '88 Symposium—Communications Architectures & Protocols, vol. 25, No. 1, 88–101 (Aug. 16, 1988).

Deering, S.E., "Host Extensions for IP Multicasting" (Aug. 1989).

Deering, S.E., "Host Extensions for IP Multicasting" (Jul. 1986).

Deering, S.E. et al., "Host Groups: A Multicast Extension to the Internet Protocol" (Dec. 1985).

Emigh, Jacqueline, "Digital runs 200 MHz chip—1st demo of Alpha—Digital Equipment Corporation's (DEC's) Alpha microprocessor," Newsbytes News Network, DECWorld (May 4, 1992).

Eng, KY, et. al., "Multicast and Broadcast Services in a Knockout Packet Switch," MFOCOM '88. Networks: Evolution or Revolution? Proceedings. Seventh Annual Joint Conference of the IEEE Computer and Communications Societies., IEEE, 29–34 (1988).

Foster, Ian, Designing and Building Parallel Programs, (Addison Wesley Nov. 2003).

Frantz et al., "Proposed VLAN Service Definition" (Oct. 1995).

Greer, Lou, "Would You Believe . . . DECWorld 2001" by Lou Greer (Jun. 25, 2001).

Grimshaw, Michael, "LAN Interconnections Technologies, Interconnecting LANs is one thing, but avoiding loops, responding to network failures, and interoperating different LANs is quite another," Telecommunications North American Edition vol. 25, No. 2 (Feb. 1991).

Gruchevksy, S., et al., "The Burroughs Integrated Adaptive Routing System (BIAS)", pp. 18–34.

Harris and Jeffreies, Inc., A Proposal for Software Development; Prepared for: Tony Bono (Clearpoint Research Corp.); For an IP–Router Facility (Feb. 19, 1991).

Hawe, Bill, et. al., "Transparent Interconnection of Local Area Networks with Bridges," Journal of Telecommunication Networks, vol. 3, No. 2, 116–130.

Jennings, Tate, et. al., "Practical SMDS Demonstrations," Proceedings 17th Conference on Local Computer Networks, 300–309 (Sep. 13, 1992).

Kaliszewski, J. M., "Routing Algorithm and Route Optimization on SITA Data Transport Network", IEEE, pp. 892–897 (1983).

Kelley, Paul, "Connecting LANs with Bridges, Systems managers have a number of decisions to make when linking LANs together, including just how far a bridge will go and which one to cross," Telecommunications North American Edition, vol. 24, No. 6, article titled (Jun. 1990).

King, Steven, "It's an Adventure (Part 2/3)," Network World, vol. 12, No. 15, Apr. 10, 1995, pp. 49–55.

Kim, Hyong S.; "Multinet Switch: Multistage ATM Switch Architecture with Partially Shared Buffers," IEEE Infocom '93: The Conference on Computer Communications Proceedings vol. 2 (Mar. 28, 1993).

Lai, Wai Sum, "Packet Forwarding", IEEE Communications Magazine, vol. 26. No. 7), pp. 8–17 (Jul. 1988).

Lidinsky, William, "802.1 Minutes and Document Plan," Presentation at IEEE 802.1 Working Group, West Palm Beach (Mar. 1995).

Lin & Wang, "A Platform for Seamless Interworking Among Conventional LANs and ATM Networks," Global Telecommunications Conference, 1994. GLOBECOM '94. 'Communications: The Global Bridge'., IEEE, vol. 1,291–5.

Concierge of Boston Corporate History (Mar. 30, 2006).

Marchok, Daniel, et. al., "Multicasting in a Growable Packet (ATM) Switch," INFOCOM '91. Proceedings. Tenth Annual Joint Conference of the IEEE Computer and Communications Societies. Networking in the 90s. IEEE, vol. 2, 850–858 (Apr. 7, 1991).

Marsden, Philip, "Interworking IEEE 802 FDDI LAN's Via the ISDN Frame Relay Bearer Service," Proceedings of the IEEE, vol. 79, No. 2 (Feb. 1991).

Martillo, Joachim, "A WAN Subsystem for a High Performance Packet Switch" (1992–98).

Martillo, Joachim, "Routing in a Bridged Network" (1990).

Martillo, Joachim; Resume (Apr. 7, 2006).

Martillo, Joachim; Patent File (Aug. 18, 1992).

McNealis, Martin, "1995—The Year of the Virtual LAN," Presentation at IEEE Conference, Maui (Jul. 1995).

McNealis, Martin, "Virtual LAN Requirements," Presentation at IEEE 802.1 Interim Meeting (Oct. 12, 1995).

Muller, Nathan J., "Ungermann–Bass Accesslone Smart Hub," (1993).

Newman, Peter, "ATM Switching, ATM Local Area Networks, LAN emulation offers a best–effort, connectionless, packet transfer service at the MAC Sublayer, implemented on top of a connection–oriented ATM network," IEEE Communications Magazine (Mar. 1994).

Ngoh, L. H., "Multicast support for group communications," Computer Networks and ISDN Systems 22 (1991).

Paliwoda, K., "Transactions involving multicast," Comp. Comm'ns, vol. 11, No. 6, 313–18 (Dec. 1988).

Pearlman, Radia; "Interconnections—Bridges and Routers," (1992).

Petrosky, Mary; "Hub Shopping Spree," Networkworld.

Piscitello, D.; Lawrence, J.; "RFC: 1209—The Transmission of IP Diagrams over SMDS Service," (Mar. 1991).

Quarterman, J.S., et al., "An Alternate Path Routing Scheme Supporting QOS and Fast Connection Setup in ATM Networks", IEEE, pp. 1224–1230 (Oct. 1996).

Rajagopalan, Bala, "Reliability and Scaling Issues in Multicast Communication," Computer Communication Review: SIGCOMM '92 Conference Proceedings, Communications Architectures and Protocols, vol. 22, No. 4 (Aug. 17, 1992).

Rooney, Sean et al.; Computer Communication Review: Automatic VLAN creation based on on–line measurement (Feb. 19, 1991).

Rozenblad, et. al. W., "Interconnection of LANsB02.6 Customer Premises Equipments (CPEs) via SMDS on Top of ATM: a case description," IFIP Transactions, vol. C–14: Proceedings of the FFIP TC61 WG6.4 Fourth International Conference on High Performance Networking IV, 42 1–442 (Dec. 14, 1992).

Segall, Adrian, et. al., "Reliable Multiuser Tree Setup with Local Identifiers," IEEE Journal on Selected Areas in Communications, vol. 9, No. 9 (Dec. 1991).

Shimada, K. Karl, "VLAN Classes," Presentation at IEEE 802.1 Interim Meeting (Oct. 11, 1995).

Shimada, K. Karl, "VLAN Requirements," Presentation at IEEE 802.1 Interim Meeting (Oct. 11, 1995).

Shimada, K. Karl, "VLAN Definition," Presentation at IEEE 802.1 Interim Meeting (Oct. 11, 1995).

Shrimpton, David; Cooper, Christopher; "Multicast communication on the Unison network," Computer Communication: network architecture (1990).

Sincoskie & Cotton, "Extended Bridge Algorithms for Large Networks," IEEE Network: The Magazine of Computer Communications, vol. 2, No. 1 (Jan. 1988).

Skorupa, Joseph; "Tough Choices ahead in hub selection: Multitude of products and promises will force users to make strategic and tactical decisions byline," and "Intelligent hubs: a marketplace survey; Cabletron Systems' Multi Media Access Center, Optical Data Systems' Infinity, etc," (May 2, 1994).

Souza, et. al. R., "GIGAswitch System: A High–Performance Packet–Switching Platform," Digital Technical Journal, vol. 6 No. 1, 9–22 (1994).

Spiegal, E. M., et al., "An Alternate Path Routing Scheme Supporting QOS and Fast Connection Setup in ATM Networks", IEEE, pp. 1224–1230 (1994).

Sterbenz, James P.G., et. al., Report and Discussion on the IEEE ComSoc TCGN Gigabit Networking Workshop 1995, IEEE Network (Jul. 1995).

Tantawy & Zitterbart, "A Scheme for High–Performance LAN Interconnection Across Public MAN'S," IEEE Journal on Selected Areas in Commmunications, vol. 11, No. 8 (Oct. 1993).

Tantawy & Zitterbart, "A Scheme for Remote LAN Bridging across SMDS MANS," Proc. Globecom '92, vol. 1 (1992).

Tobagi, Fouad A., "Fast packet switch architectures for broadband integrated services digital networks", Pro. IEEE 133–67 (1990).

Trip Report: DECworld, Boston. Author: J.J. Bunn DECCO Project. Report discusses the DEC products.

Truong, Hong Linh et al.; LAN Emulation on an ATM Network, IEEE Communication magazine (1995).

Tu & Leung, "Multicast Connection–Oriented Packet Switching Networks," Proc. Of SUPERCOMM Int'l Conference on Comm'ns (1990).

Wakerly, John, and David Cheriton, Alantec—"Virtual LAN Management Protocol (VLMP)" presentation (Oct. 11–13, 1995).

Wakerly, John, "Alantec Intelligent Switching Hubs, Some VLAN Styles," Presentation from the IEEE 802.1 Meeting (Oct. 11, 1995).

Yang, Henry, and Anil Rijsinghani, Some VLAN Requirements and Considerations (Jul. 11, 1995).

Yum & Chen, "Multicast Source Routing in Packet–Switched Networks," IEEE Infocom '91—Networking in the 90s, The Conference on Computer Communications Proceedings vol. 3 (Apr. 7, 1991).

Zhang, Lixia et al.; "RSVP: A New Resource Reservation Protocol,".

"Virtual LANs Get Real," Data Communications, vol. 24, No. 3, Mar. 1995, pp. 87–100.

Feature: Virtual LAN switch backbone support companies, Network World (Apr. 10, 1995).

IEEE 802 Standards Committee, Instructions to the Editor for the revision of Overview and Architecture, IEEE Doc. P802.1–95/007 (Jul. 12, 1995).

IEEE 802 Standards Committee, Instructions to the Editor for P802, and Ballot Summary, IEEE Doc. P802.1–95/008 (Jul. 12, 1995).

IEEE 802 Standards Committee, "Proposed comments on ISO/IEC 10038PDAM 2," IEEE Doc. P802.1–95/009 (Jul. 12, 1995).

IEEE 802 Standards Committee, "Proposed comments on ISO/IEC 15802–5PDAM 1" IEEE Doc. P802.1–95/010 (Jul. 12, 1995).

IEEE 802 Standards Committee, "802.1 Resolution on progression of VLAN work," IEEE Resolution (Jul. 1995).

IEEE 802.1 Working Group, "IEEE 802.1 Working Group, Minutes of the Mar. 1995 Meeting" (Mar. 1995).

IEEE Standards for Local and Metropolitan Area Networks: Media Access Control (MAC) Bridges.

One page document with the word "Background" on it.

6th Issue of Phantasy, a Publication and Newsletter of the International Information Retrieval Guild, Volume number three. Table of Contents: 1) I1RG Announces New Distribution Network by Mercenary; 2) Making Your Own Nitrous Oxide (Laughing Gas) by Sain.

Web Documents: Re: ethernet multicast.

IEEE Computer Society, IEEE Standards for Local and Metropolitan Area Networks: Standard for Interoperable LAN/MAN Security.

IEEE Computer Society, 802.1 Q IEEE Standards for Local and Metropolitan area networks—Virtual Bridged Local Area Networks.

Presentation titled "1995—The Year of the Virtual LAN," IEEE Conference, Maui, Jul. 1995.

Document titled Hosts Groups: A Multicast Extension for Datagram Internetworks by David R. Cheriton and Stephen E. Deering (Computer Systems Laboratory Standord University).

Thread of Web Documents: (1) Re: Response to anti–bridge comments; (2) Slithernet: A Proposal for Using Moderate–To–High–Speed Synchronous Serial Connections as a LAN–like Networking Medium; (3) Serial Line Data Encapsulation for the Framing of a Synchronous Serial Point–to–Point Data Stream.

Thread of Web Documents: (1) talking of and to gateways and bridges; (2) danger of bridges; (3) Response to anti–bridge comments.

Thread of Web Documents: (1) Using Wide–Area Point–to–Point Links for Computer Networking; (2) Slithernet: A Proposal for Using Moderate–To–High–Speed Synchronous Serial Connections as a LAN–like Networking Medium; (3) Summary: network expansion; (4) updated SITA proposal.

Digital Equipment International Limited, Request for grant of a Patent form 1/77—Communication System.

Excerpts for www.cisco.com: VLAN Interoperability (Jan. 9, 2006).

Google's cache of http://www.compaq.pe.kr/HW/COMM/Switches/DGSRA/resources.html (Mar. 1, 2005).

Asoh et al., Virtual LAN Realization on an ATM Connectionless Public Network. Second Asia Pacific Conference on Communications, Jun. 1995, Japan, vol. 2, pp. 516.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 5, 7, 9, and 11-17 is confirmed.

Claims 1, 2, 4, 6 and 8 are cancelled.

New claims 19-25 are added and determined to be patentable.

Claims 10 and 18 were not reexamined.

*19. The method of claim 1, further comprising:*
*identifying a group identifier assigned to a source of the communication;*
*identifying a group identifier assigned to a destination of the communication; and*
*if the group identifier assigned to the source and the group identifier assigned to the destination are different, sending the communication out a port not within the first plurality of ports.*

*20. The method of claim 1, further comprising:*
*assigning a protocol type to each group identifier based at least in part on an evaluation of each group identifier.*

*21. The method of claim 1, wherein sending the communication out of the bridge on all other ports of the first plurality of ports having the same assigned group identifier as the first port comprises:*
*removing the group identifier from the multicast packet; and*
*subsequent to removing the group identifier from the multicast packet, sending the multicast packet out of the bridge without the group identifier.*

*22. The method of claim 1, wherein the act of assigning the group identifier is independent of the communication; and wherein sending the communication out of the bridge on all other ports of the first plurality of ports having the same assigned group identifier as the first port comprises:*
*sending the multicast packet out of the bridge without adding a header to the multicast packet.*

*23. A method of operating a network bridge having a plurality of ports through which network communications pass to and from the bridge, the method comprising:*
*creating, by a user, a group of a first plurality of ports by specifying a group identifier assigned to each port of the first plurality of ports, wherein all ports with the group identifier are in the group;*
*receiving a communication on a first port of the bridge; and*
*if the first port is one of the first plurality of ports and the communication is a multicast packet having a multicast destination address, sending the multicast packet having a packet header that includes the group identifier out of the bridge on all other ports of the first plurality of ports having the same assigned group identifier as the first port.*

*24. A method of operating a network bridge having a plurality of ports through which network communications pass to and from the bridge, the method comprising:*
*creating, by a user, a group of a first plurality of ports by specifying a group idnetifier assigned to each port of the first plurality of ports, wherein all ports with the group identifier are in the group;*
*receiving a communication on a first port of the bridge; and*
*if the first port is one of the first plurality of ports and the communication is a multicast packet having a multicast destination address, sending the multicast packet out of the bridge on all other ports of the first plurality of ports having the same assigned group identifier as the first port without adding a header to the multicast packet.*

*25. A method of operating a network bridge having a first plurality of ports through which network communications pass to and from the bridge, the method comprising:*
*assigning a first group identifier to each port of the first plurality of ports, wherein all ports with the first group identifier are in the first group;*
*assigning a second group identifier to each port of a second plurality of ports, wherein all ports with the second group identifier are in the second group;*
*isolating the first plurality of ports from the second plurality of ports;*
*subsequent to the acts of assigning the first group and assigning the second group, receiving a communication on a first port of the bridge; and*
*if the first port is one of the first plurality of ports and the communication is a multicast packet having a multicast destination address, sending the communication out of the bridge on all other ports of the first plurality of ports having the first group identifier.*

* * * * *